US010693586B2

(12) United States Patent
Park et al.

(10) Patent No.: US 10,693,586 B2
(45) Date of Patent: Jun. 23, 2020

(54) METHOD FOR RECEIVING REFERENCE SIGNAL RESOURCES IN A WIRELESS COMMUNICATION SYSTEM AND APPARATUS

(71) Applicant: LG Electronics Inc., Seoul (KR)

(72) Inventors: Jonghyun Park, Seoul (KR); Jiwon Kang, Seoul (KR); Kijun Kim, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,325

(22) PCT Filed: Dec. 28, 2017

(86) PCT No.: PCT/KR2017/015639
§ 371 (c)(1),
(2) Date: Jan. 8, 2019

(87) PCT Pub. No.: WO2018/124770
PCT Pub. Date: Jul. 5, 2018

(65) Prior Publication Data
US 2019/0312668 A1   Oct. 10, 2019

Related U.S. Application Data

(60) Provisional application No. 62/444,312, filed on Jan. 9, 2017, provisional application No. 62/439,879, filed on Dec. 28, 2016.

(51) Int. Cl.
*H04L 1/00* (2006.01)
*H04L 5/00* (2006.01)
(Continued)

(52) U.S. Cl.
CPC .............. *H04L 1/0026* (2013.01); *H04L 5/00* (2013.01); *H04L 5/0051* (2013.01);
(Continued)

(58) Field of Classification Search
CPC ....... H04L 5/008; H04L 5/0057; H04L 5/001; H04L 5/0051; H04W 72/046; H04W 24/10; H04W 16/28
See application file for complete search history.

(56) References Cited

U.S. PATENT DOCUMENTS

2016/0337016 A1* 11/2016 Capar ................. H04B 7/0456
2017/0026938 A1*  1/2017 Onggosanusi ....... H04B 7/0626
(Continued)

FOREIGN PATENT DOCUMENTS

KR      1020160055060 A      5/2016

OTHER PUBLICATIONS

Author Unknown, Design of beam management procedure P3, 3GPP TSG RAN WG1 Meeting #87, Doc. No. R1-1611387, pp. 1-3, Nov. 18, 2016 (Year: 2016).*

(Continued)

*Primary Examiner* — Christopher M Crutchfield
(74) *Attorney, Agent, or Firm* — Fish & Richardson P.C.

(57) ABSTRACT

A method for receiving a Channel State Information (CSI)-Reference Signal (RS) resource in a wireless communication system, the method performed by a User Equipment (UE) may include: receiving, from a base station, a configuration for a CSI-RS resource set including a plurality of CSI-RS resources; receiving the plurality of CSI-RS resources; and when a transmission via different transmission beams of the plurality of CSI-RS resources is configured, reporting a CSI-RS Resource Indicator (CRI) for the plurality of CSI-RS resources to the base station, when a transmission via a same transmission beam of the plurality of CSI-RS resources is configured, not reporting the CRI for the plurality of CSI-RS resources to the base station.

16 Claims, 13 Drawing Sheets

(51) Int. Cl.
H04W 16/28 (2009.01)
H04W 72/04 (2009.01)
(52) U.S. Cl.
CPC .......... H04L 5/0057 (2013.01); H04W 16/28 (2013.01); H04W 72/046 (2013.01); H04L 5/0007 (2013.01)

(56) References Cited

U.S. PATENT DOCUMENTS

2017/0063503 A1* 3/2017 Liu .................. H04L 5/0044
2018/0092129 A1* 3/2018 Guo ................. H04L 5/0048
2019/0280746 A1* 9/2019 Zhang ............... H04B 7/0456

OTHER PUBLICATIONS

Author Unknown, On the need for more flexible configurations related to CSI reporting, R1-1611237, pp. 1-6, Nov. 18, 2016 (Year: 2016).*
Author Unknown, Reference Signal and Procedure for Beam Management P-2 and P-3, R1-1611986, pp. 1-3, Nov. 18, 2016 (Year: 2016).*
Author Unknown, Reference Signal and Procedure for UE Beam Refinement BM P-3, Oct. 14, 2016, pp. 1-4 (Year: 2016).*
Author Unknown, Reference Signal and Procedure for Beam Management P-1, Doc No. R1-1611985, Nov. 18, 2016, pp. 1-13 (Year: 2016).*
ZTE, 'Beam selection and CSI acquisition for NR MIMO', R1-1611417, 3GPP TSG RAN WG1 Meeting #87, Reno, USA, Nov. 5, 2016, 8 pages.
Nokia, 'Remaining Details of Hybrid CSI', R1-1611278, 3GPP TSG RAN WG1 Meeting #87, Reno, USA, Nov. 4, 2016, 6 pages.
Samsung, 'CSI acquisition for DL NR MIMO', R1-1612500, 3GPP TSG RAN WG1 Meeting #87, Reno, USA, Nov. 4, 2016, 6 pages.
Catt, 'Remaining issues on hybrid CSI feedback', R1-1611344, 3GPP TSG RAN WG1 Meeting #87, Reno, USA, Nov. 5, 2016, 5 pages.
Samsung, 'Discussion on Dl beam management procedures P-2 and P-3', R1-1612509, 3GPP Tsg Ran WG1 Meeting #87, Reno, Usa, 201611.04, 6 pages.
Downlink, 3GPP TS 36.211 V14.0.0 (Sep. 29, 2016), 70 pages.
Yosuke Sano, et.al., "LTE-Advanced Release 13 Multiple Antenna Technologies and Improved Reception Technologies", NTT Docomo technical journal vol. 18 No. 2, pp. 62-71, (Oct. 2016), 10 pages.
Catt, R1-1611389, On beam determination, 3GPP TSG RAN WG1 #87, 3GPP (Nov. 5, 2016), 3 pages.
Extended European Search Report in European Application No. 17885619.1, dated Jan. 20, 2020, 9 pages.
Intel Corporation, "Reference Signal and Procedure for Beam Management P-2 and P-3," R1-1611986, 3GPP TSG-RAN WG1 #87, Reno, USA, dated Nov. 14-18, 2016, 3 pages, XP-051175950.
Samsung, "DL beam management RS for multi-beam > 6GHZ NR system," R1-1612495, 3GPP TSG RAN WG1 #87, Reno, US, dated Nov. 14-18, 2016, 5 pages, XP-051176442.

* cited by examiner

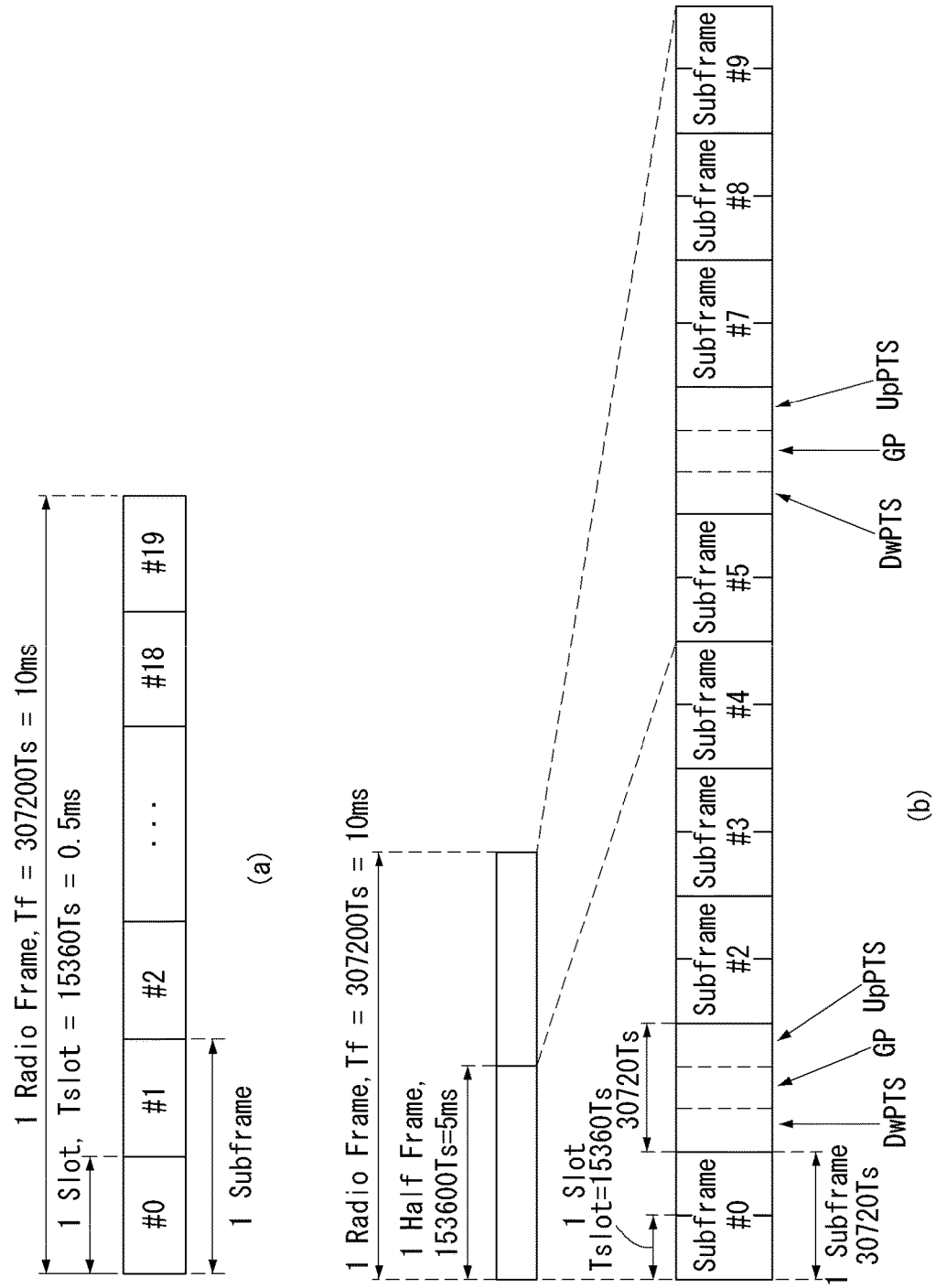

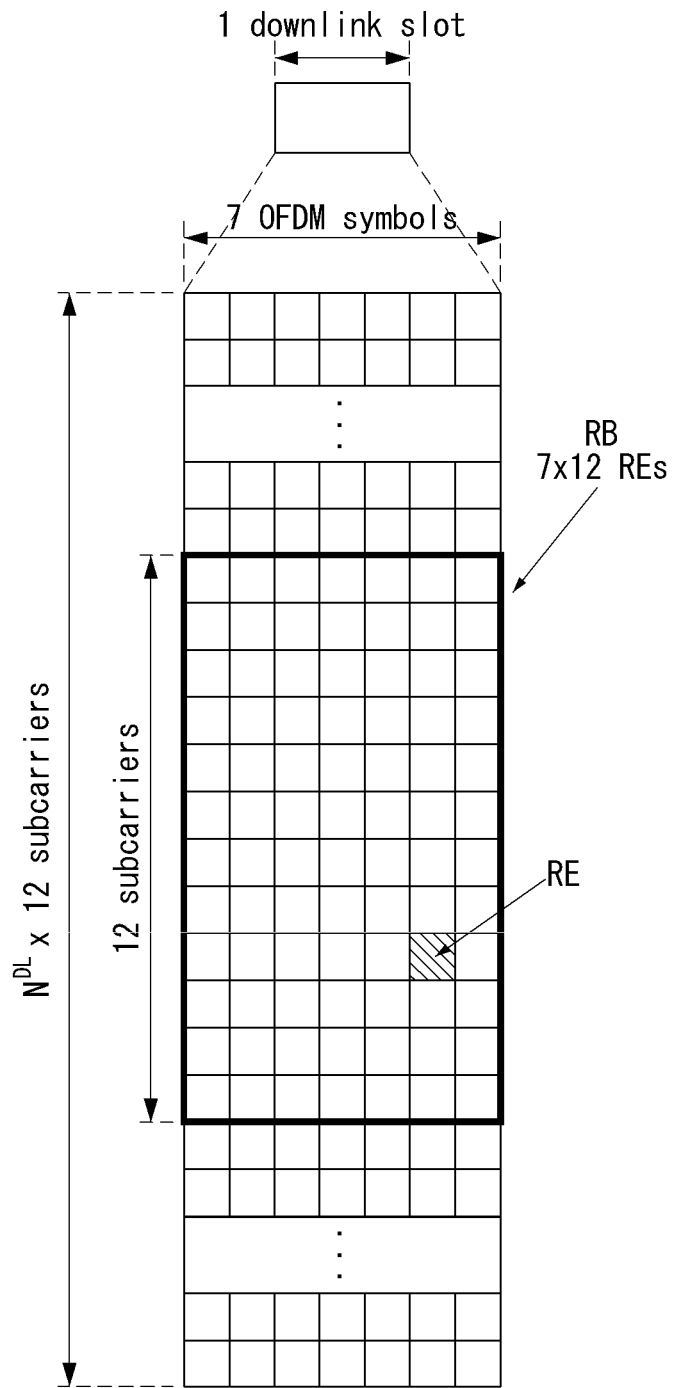
[FIG.2]

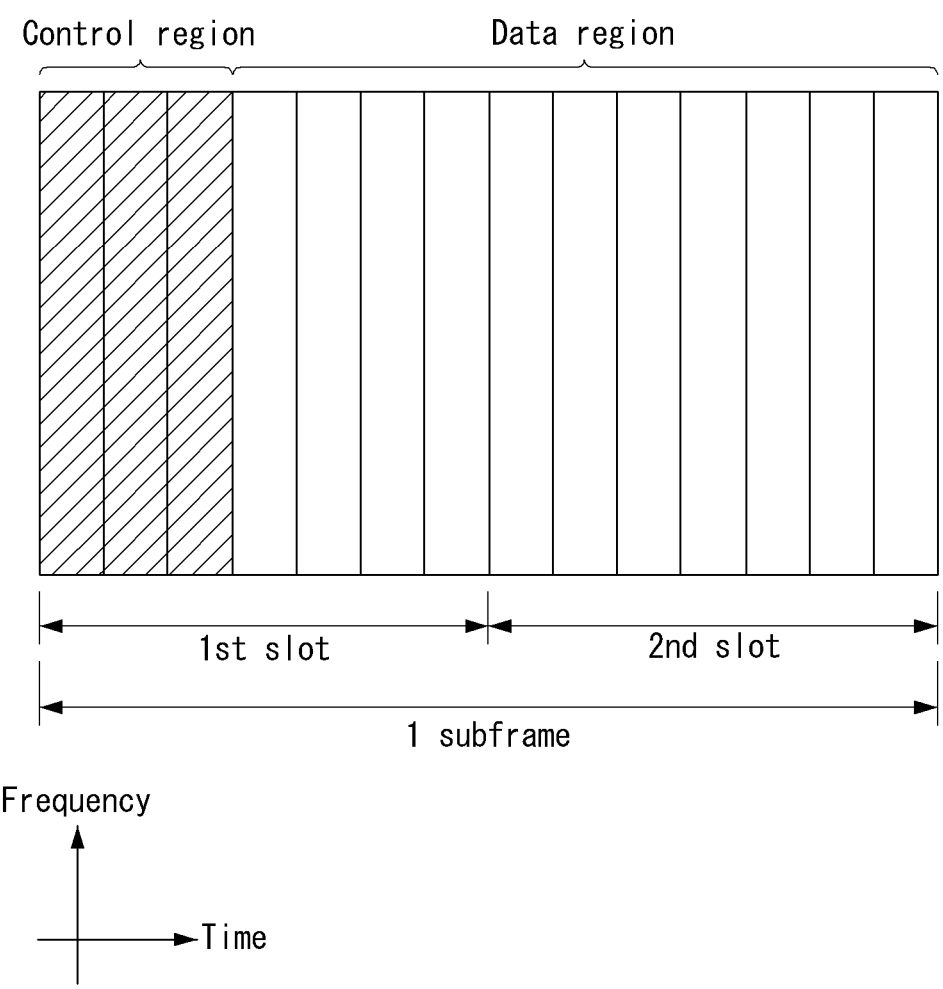
[FIG.3]

[FIG.4]
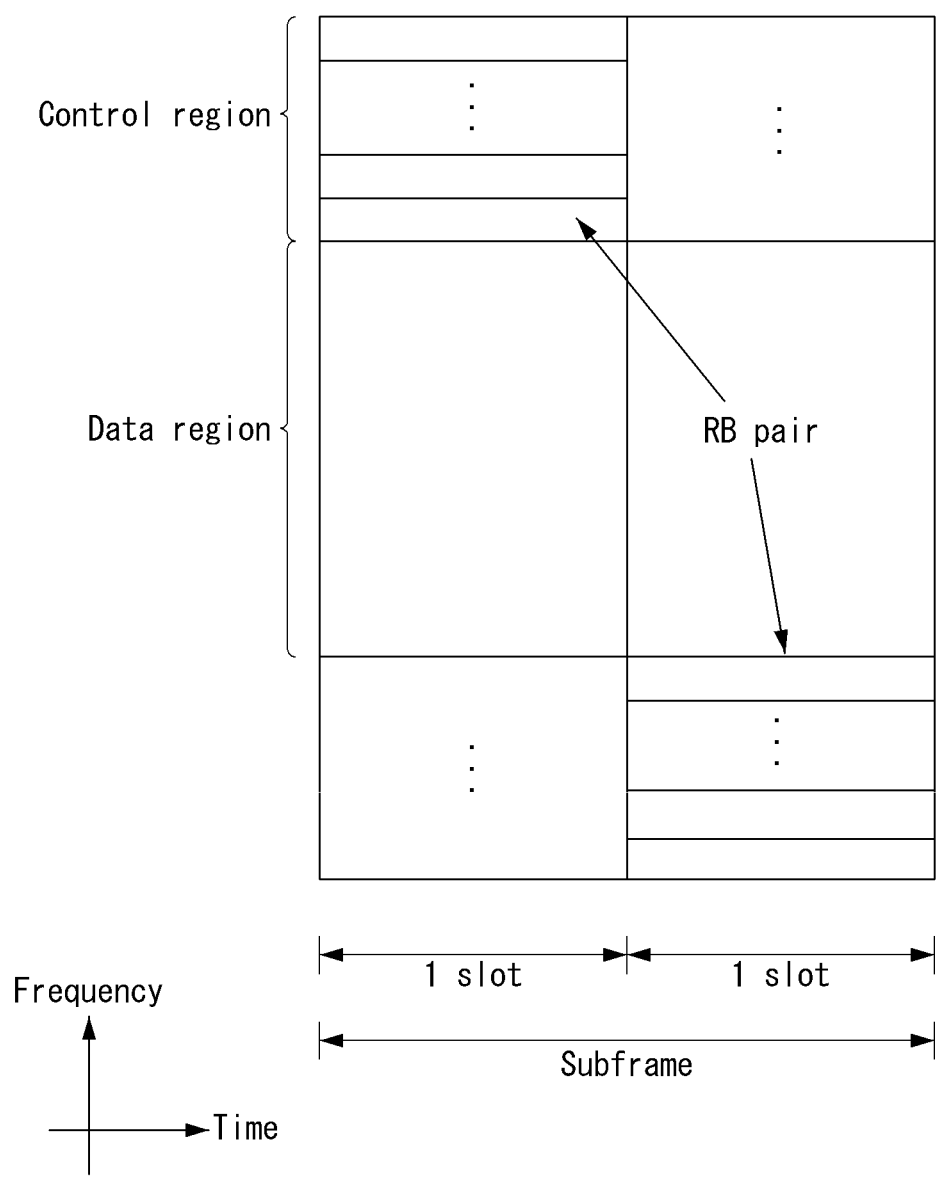

[FIG.5]
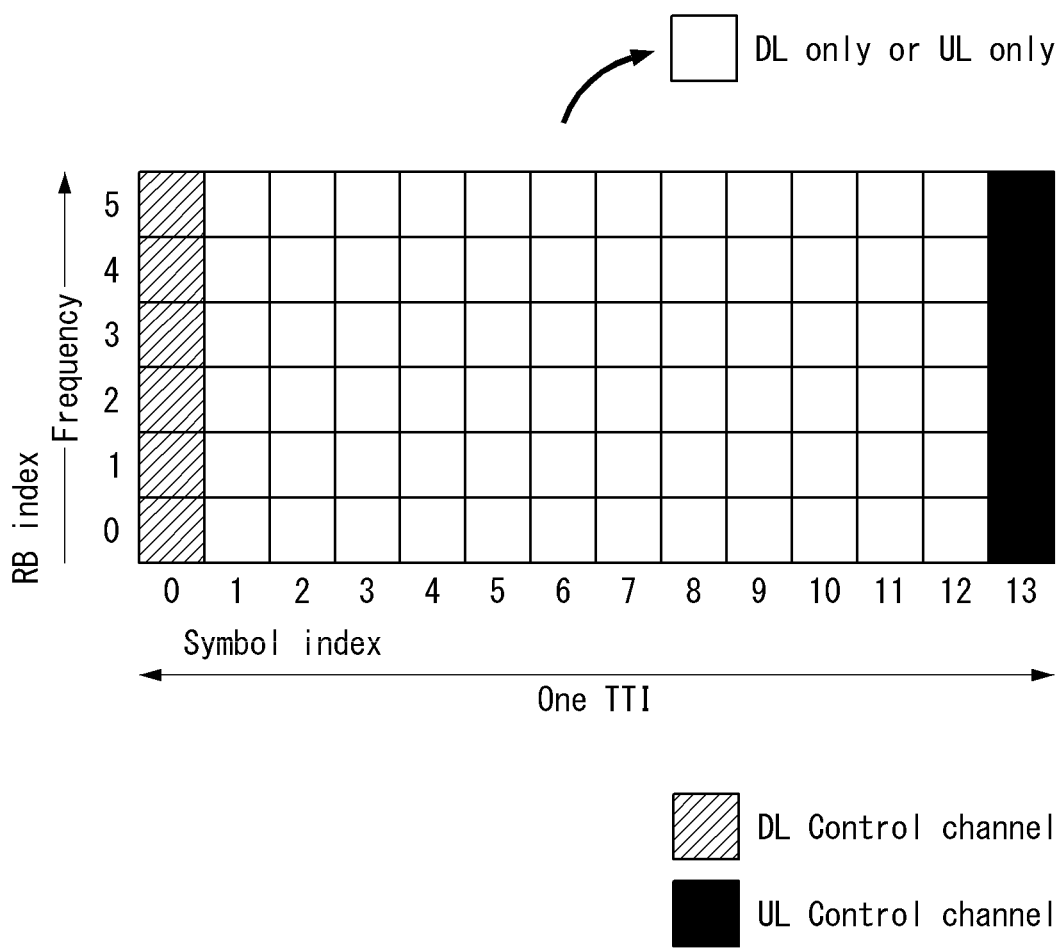

[FIG.6]
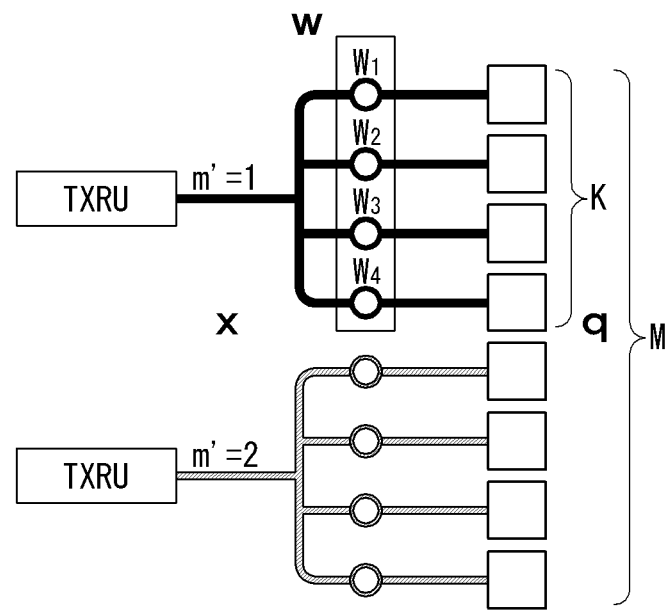
[FIG.7]
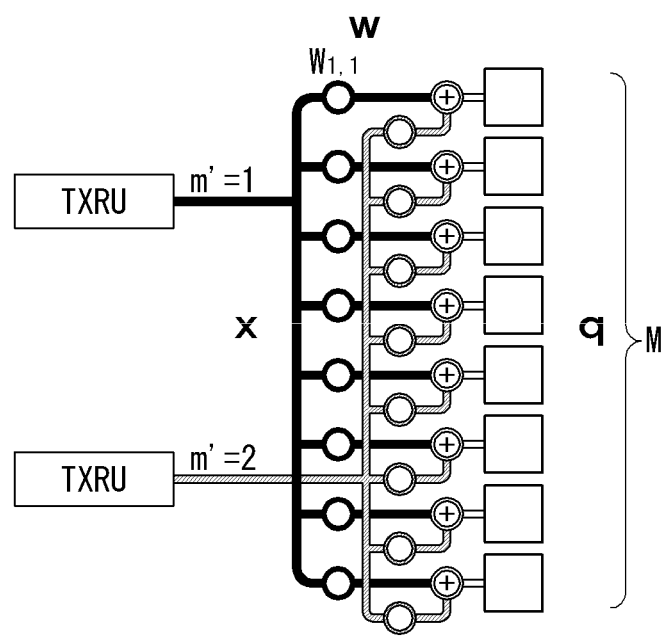

[FIG.8]
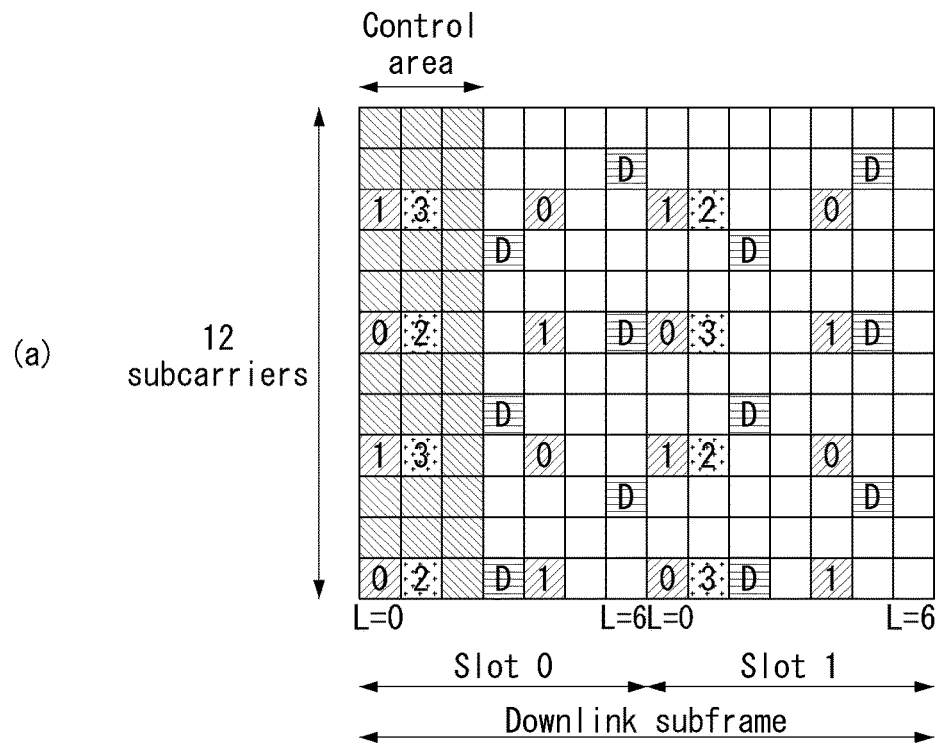
(a)
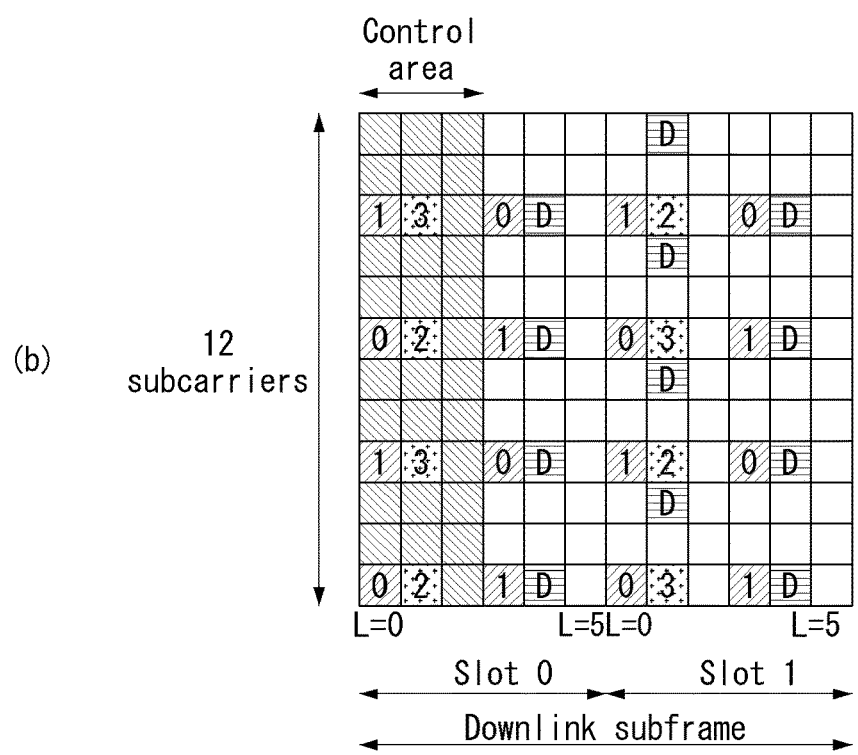
(b)

[FIG.9]
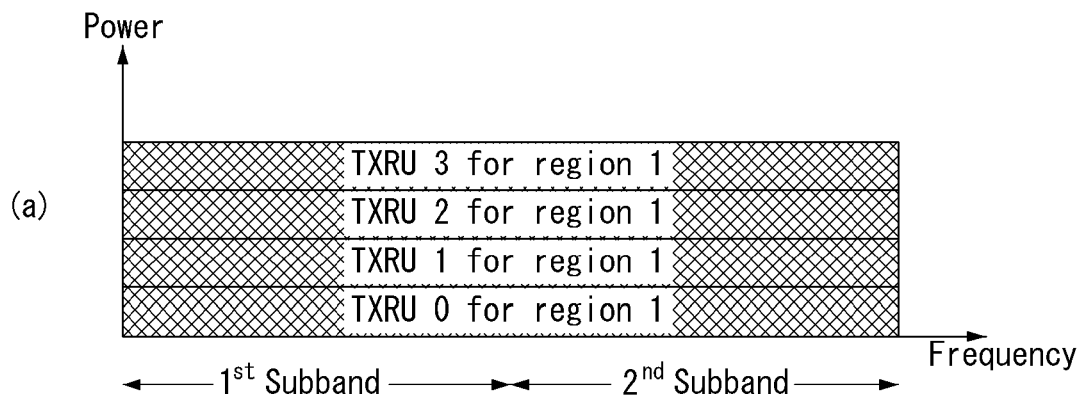
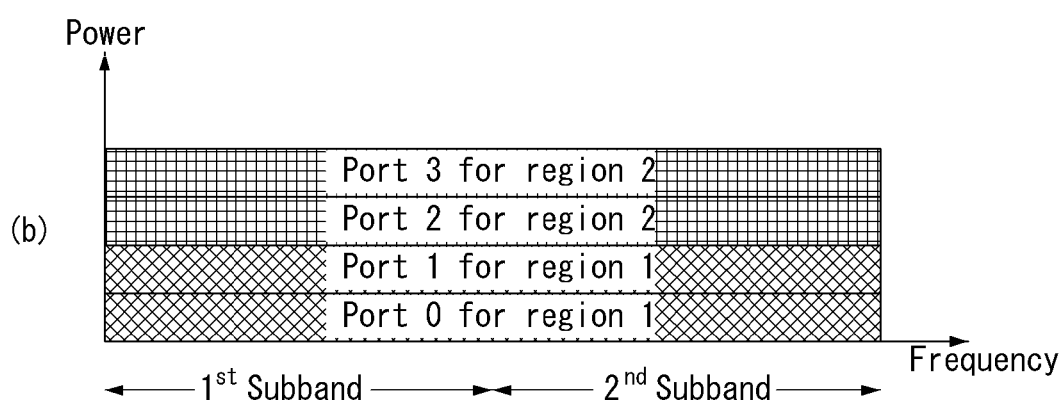
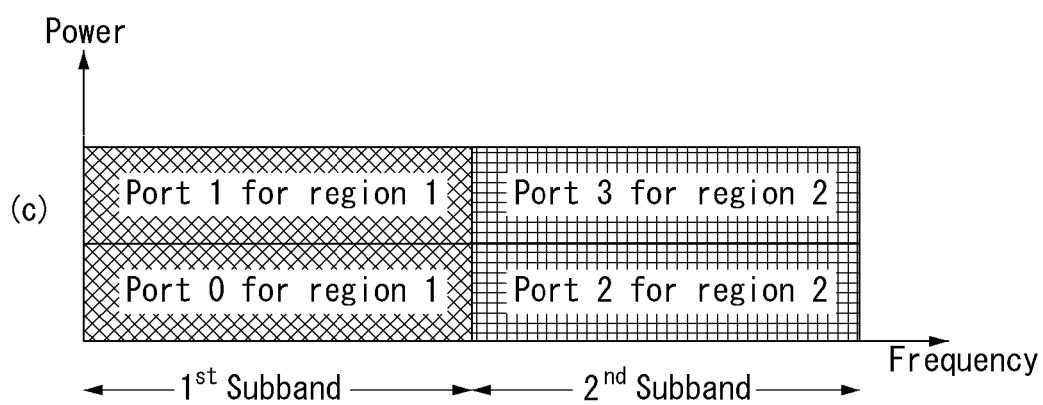

[FIG.10]
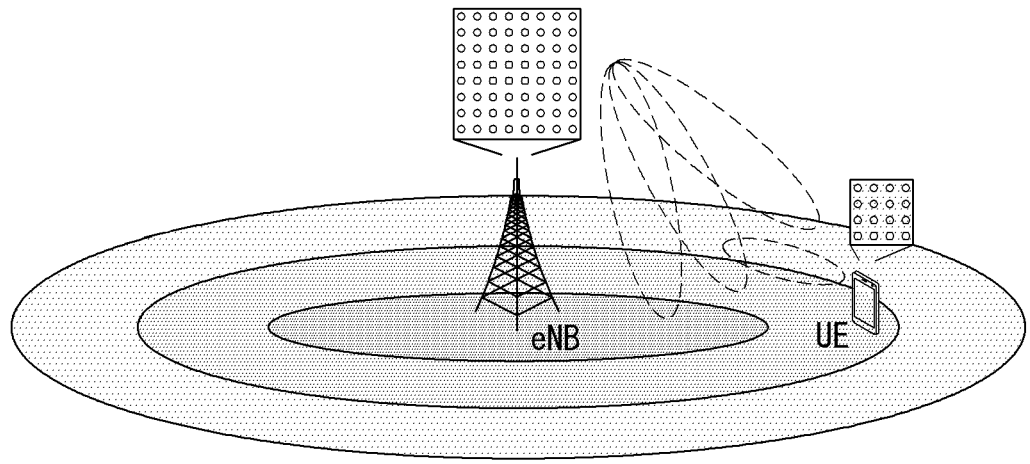
[FIG.11]
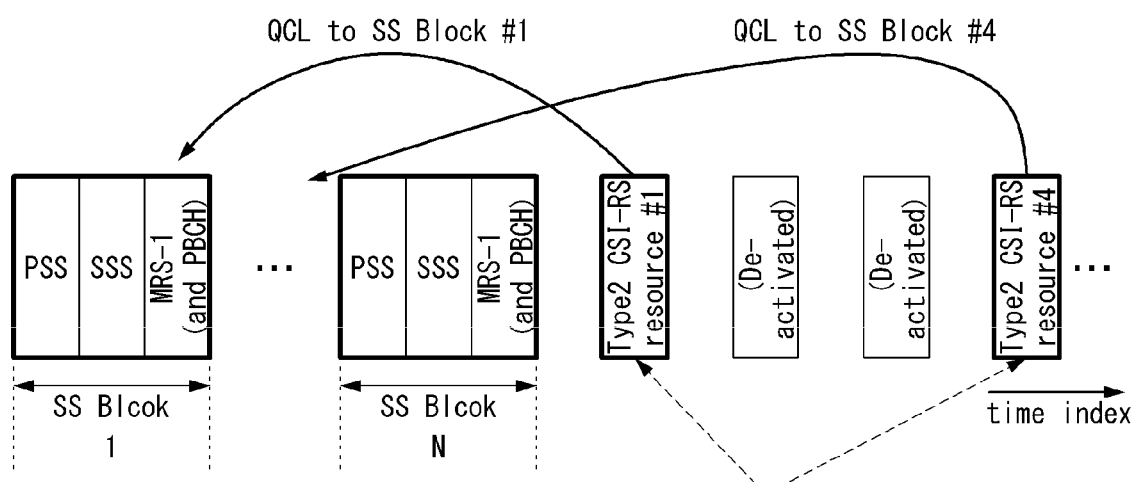

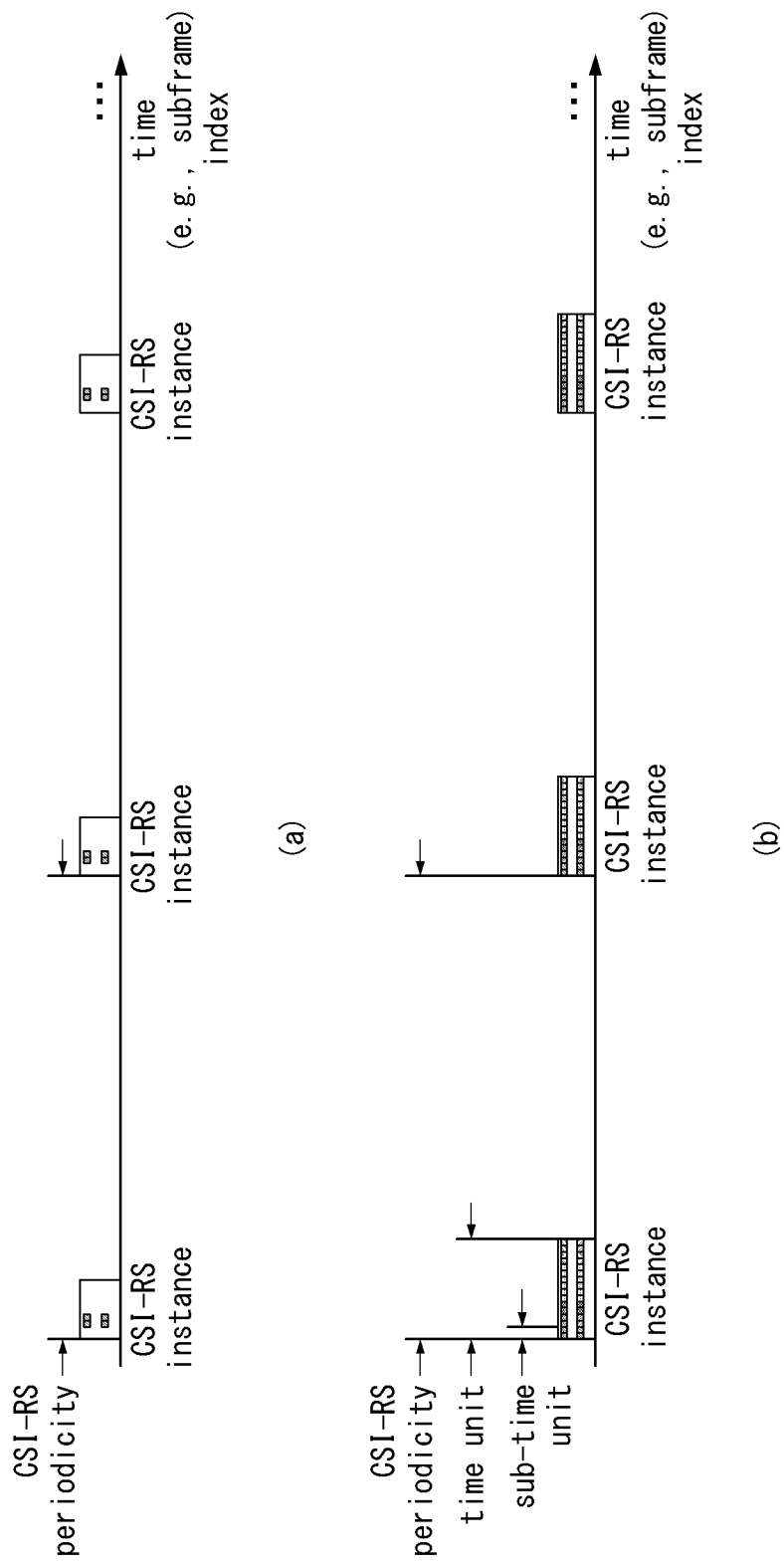
[FIG.12]

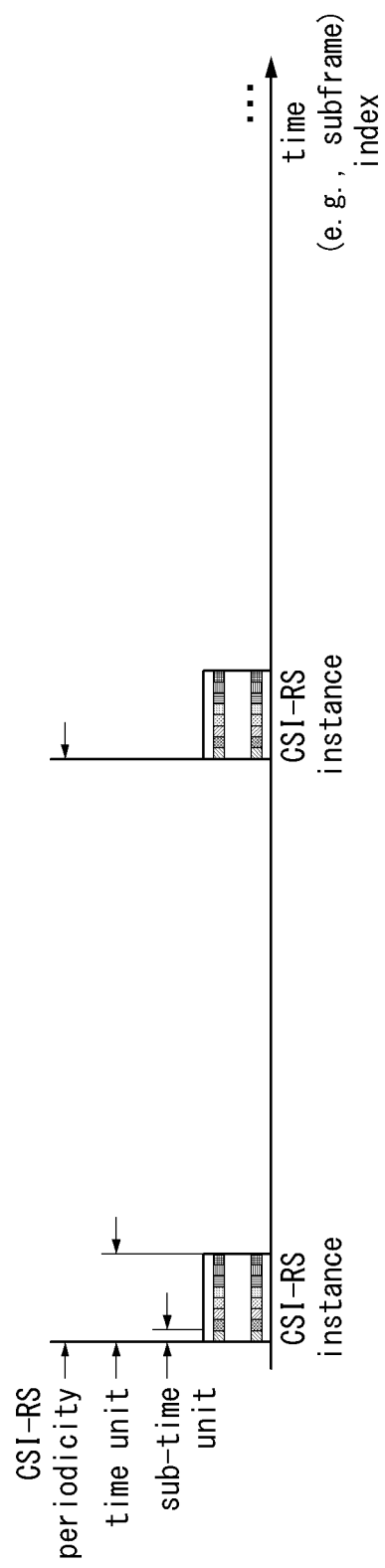
[FIG.13]

[FIG.14]
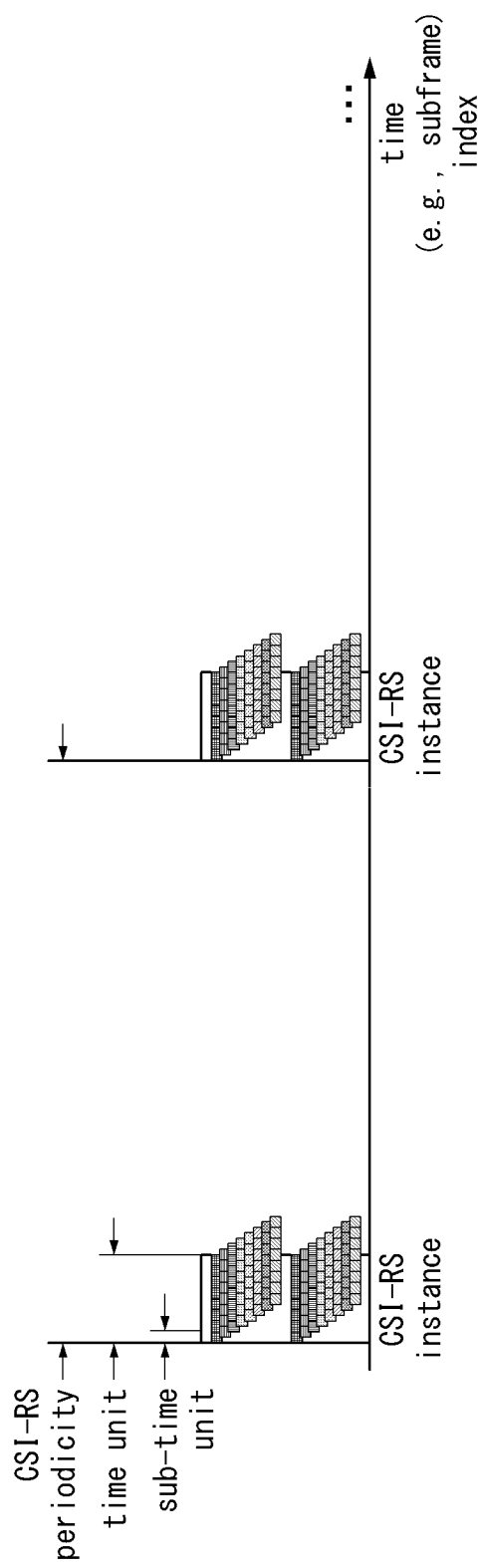

[FIG.15]
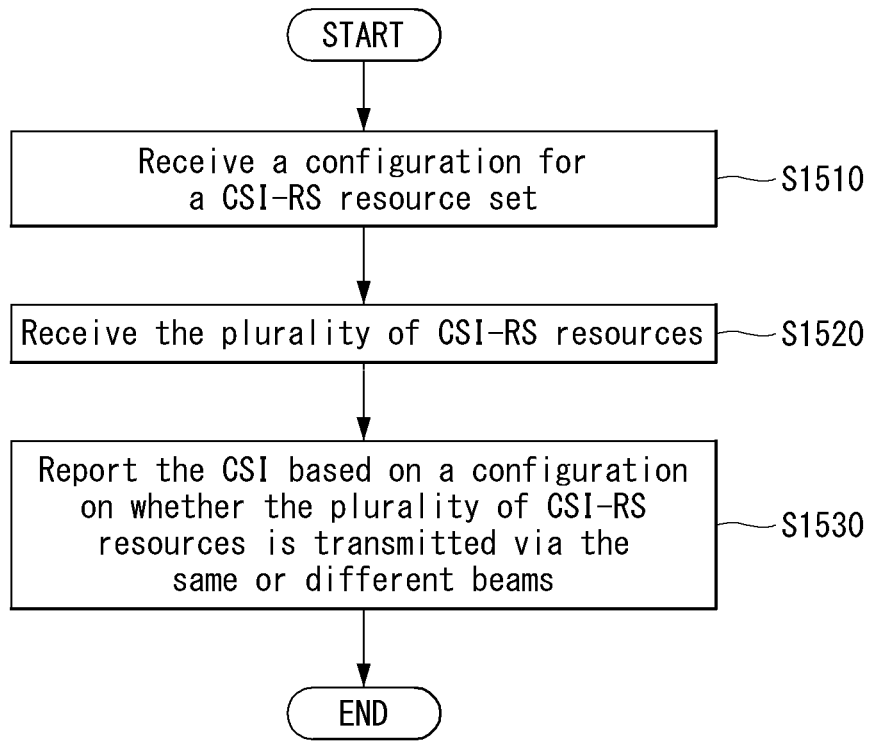
[FIG.16]
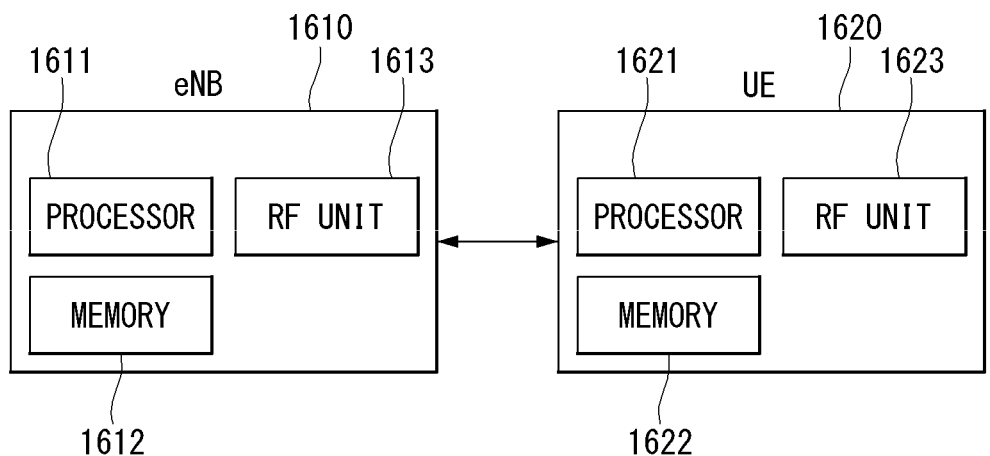

METHOD FOR RECEIVING REFERENCE SIGNAL RESOURCES IN A WIRELESS COMMUNICATION SYSTEM AND APPARATUS

CROSS-REFERENCE TO RELATED APPLICATIONS

This application is the National Stage filing under 35 U.S.C. 371 of International Application No. PCT/KR2017/015639, filed on Dec. 28, 2017, which claims the benefit of U.S. Provisional Application No. 62/439,879, filed on Dec. 28, 2016, and U.S. Provisional Application No. 62/444,312, filed on Jan. 9, 2017. The contents of which are all hereby incorporated by reference herein in their entirety.

TECHNICAL FIELD

The present invention relates to wireless communications, and more particularly, to a method for a User Equipment to receive a reference signal of a CSI-RS resource and an apparatus for the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to propose a CSI acquisition procedure applicable to a new wireless communication system. Particularly, an object of the present invention is to propose an efficient CSI acquisition procedure for determining an optimal transmission/reception beam of a base station and an optimal transmission/reception beam of a User Equipment.

Technical objects to be achieved by the present invention are not limited to the aforementioned technical objects, and other technical objects not described above may be evidently understood by a person having ordinary skill in the art to which the present invention pertains from the following description.

Technical Solution

According to an embodiment of the present invention, a method for receiving a Channel State Information (CSI)-Reference Signal (RS) resource in a wireless communication system, the method performed by a User Equipment (UE) may include: receiving, from a base station, a configuration for a CSI-RS resource set including a plurality of CSI-RS resources; receiving the plurality of CSI-RS resources; and when a transmission via different transmission beams of the plurality of CSI-RS resources is configured, reporting a CSI-RS Resource Indicator (CRI) for the plurality of CSI-RS resources to the base station, when a transmission via a same transmission beam of the plurality of CSI-RS resources is configured, not reporting the CRI for the plurality of CSI-RS resources to the base station.

In addition, the CSI-RS resource set may be configured to the UE, by a resource (RS) setting for a CSI report.

In addition, a reporting scheme of the CSI may be configured to the UE, by a CSI reporting setting related to the CSI-RS resource setting.

In addition, when 'No report' is configured to the UE in relation to the CSI-RS resource, any of the CSI including the CRI may not be reported to the base station.

In addition, a connection relation between the RS setting and the CSI reporting setting may be indicated by a measurement setting configured to the UE.

In addition, the method for receiving CSI-RS resource may further include, when the transmission via the same transmission beam of the plurality of CSI-RS resources is configured, selecting a reception beam of the UE based on a measurement result for the plurality of CSI-RS resources.

In addition, the step of selecting the reception beam of the UE may include measuring the plurality of CSI-RS resources using different reception beams; and selecting at least one reception beam among the different reception beams based on the measurement result for the plurality of CSI-RS resources.

In addition, the base station may be a network node selecting at least one transmission beam among different transmission beams based on the CRI transmitted from the UE.

In addition, the reception beam and the transmission beam may be jointly selected or sequentially selected according to a preconfigured order.

In addition, the preconfigured order may be determined as an order from the transmission beam to the reception beam.

According to another aspect of the present invention, a user equipment (UE) for receiving a Channel State Information (CSI)-Reference Signal (RS) resource in a wireless communication system may include a Radio Frequency (RF) unit for transmitting and receiving a radio signal; and a processor for controlling the RF unit, and the processor is configured to: receive, from a base station, a configuration for a CSI-RS resource set including a plurality of CSI-RS resources; receive the plurality of CSI-RS resources; and when a transmission via different transmission beams of the plurality of CSI-RS resources is configured, report a CSI-RS Resource Indicator (CRI) for the plurality of CSI-RS resources to the base station, when a transmission via a same transmission beam of the plurality of CSI-RS resources is configured, does not report the CRI for the plurality of CSI-RS resources to the base station.

In addition, the CSI-RS resource set may be configured to the UE, by a resource (RS) setting for a CSI report.

In addition, a reporting scheme of the CSI may be configured to the UE by a CSI reporting setting related to the CSI-RS resource setting.

In addition, when 'No report' is configured to the UE in relation to the CSI-RS resource, any of the CSI including the CRI may not be reported to the base station.

In addition, a connection relation between the RS setting and the CSI reporting setting may be indicated by a measurement setting configured to the UE.

Technical Effects

According to an embodiment of the present invention, according to an introduction of a CSI procedure for an optimal beam selection, a selection of an optimal base station transmission/reception beam and an optimal User Equipment transmission/reception beam becomes available, and there is an effect that transmission efficiency is improved.

Effects which may be obtained by the present invention are not limited to the aforementioned effects, and other technical effects not described above may be evidently understood by a person having ordinary skill in the art to which the present invention pertains from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 shows the structure of a radio frame in a wireless communication system to which an embodiment of the present invention may be applied.

FIG. 2 is a diagram illustrating a resource grid for one downlink slot in a wireless communication system to which an embodiment of the present invention may be applied.

FIG. 3 shows the structure of a downlink subframe in a wireless communication system to which an embodiment of the present invention may be applied.

FIG. 4 shows the structure of an uplink subframe in a wireless communication system to which an embodiment of the present invention may be applied.

FIG. 5 illustrates a self-contained subframe structure to which the present invention may be applied.

FIG. 6 exemplifies a sub-array partition model, which is a first TXRU virtualization model option.

FIG. 7 exemplifies a full-connection model, which is a second TXRU virtualization model option.

FIG. 8 illustrates reference signal patterns mapped to downlink resource block pairs in a wireless communication system to which the present invention may be applied.

FIG. 9 is a diagram illustrating a service area for each TXRU.

FIG. 10 is a diagram illustrating 3D MIMO system using 2D AAS according to an embodiment of the present invention.

FIG. 11 is a diagram illustrating necessary QCL linkages/relations regarding Type 2 CSI-RS resources according to an embodiment of the present invention.

FIG. 12 is a diagram illustrating a CSI-RS transmission scheme according to an embodiment of the present invention.

FIG. 13 is a diagram illustrating an RS setting method according to an embodiment of the present invention.

FIG. 14 is a diagram illustrating an RS setting method according to an embodiment of the present invention.

FIG. 15 is a flowchart illustrating a CSI-RS resource reception method by performed a UE according to an embodiment of the present invention.

FIG. 16 illustrates a block diagram of a wireless communication apparatus according to an embodiment of the present invention.

MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station (BS) (or eNB) has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), an access point (AP), g-NodeB (gNB), New RAT (NR) or 5G-NodeB Remote radio head (RRH), transmission point (TP), reception point (RP), transmission/reception point (TRP), relay. Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 below shows a configuration (length of DwPTS/GP/UpPTS) of a special subframe.

TABLE 2

| Special subframe configuration | Normal cyclic prefix in downlink | | | Extended cyclic prefix in downlink | | |
| --- | --- | --- | --- | --- | --- | --- |
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

As more communication devices require greater communication capacity, a necessity of mobile broadband communication which is more improved than the existing radio access technology (RAT) has been raised. In addition, the massive MTC (Machine Type Communications) that provides various services anytime and anywhere by connecting a plurality of devices and objects is also one of important issues, which is considered in a next generation communication. Moreover, it has been discussed a design of a communication system in which a service and/or a UE sensitive to reliability and latency. As such, an introduction of a next generation RAT has been discussed currently, which considers enhanced mobile broadband communication, massive MTC, Ultra-Reliable and Low Latency Communication (URLLC), and the like, and such a technology is referred to as 'new RAT (NR)'.

Self-Contained Subframe Structure

FIG. 5 illustrates a self-contained subframe structure to which the present invention may be applied.

In TDD system, in order to minimize data transmission delay, the self-contained subframe structure as shown in FIG. 5 has been considered in 5 Generation new RAT. The shaded area in FIG. 5 shows a downlink control region, and the dark area shows an uplink control region. In addition, the area not marked in FIG. 5 may be used for a downlink (DL) data transmission or an uplink (UL) data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the delay till the last data forwarding may be minimized.

As an example of the self-contained subframe structure which may be configured/setup in a system operating based on New RAT, the following at least four subframe types may be considered. Hereinafter, the durations existed in each of the subframe types are numerated in time sequence.

1) DL control duration+DL data duration+guard period (GP)+UL control duration

2) DL control duration+DL data duration

3) DL data duration+GP+UL control duration+UL control duration

4) DL data duration+GP+UL control duration

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be setup as GP, and such a subframe type may be referred to as 'self-contained SF'.

Analog Beamforming

In Millimeter Wave (mmW) band, a wavelength becomes short and an installation of a plurality of antenna elements is available in the same area. That is, the wavelength in 30 GHz band is 1 cm, and accordingly, an installation of total 100 antenna elements is available in 2-dimensional arrangement shape with 0.5 lambda (wavelength) intervals in 5 by 5 cm panel. Therefore, in mmW band, beamforming (BF) gain is increased by using a plurality of antenna elements, and accordingly, coverage is increased or throughput becomes higher.

In this case, each antenna element has a Transceiver Unit (TXRU) such that it is available to adjust a transmission power and a phase, and independent beamforming is available for each frequency resource. However, it has a problem that effectiveness is degraded in a cost aspect when TXRUs are installed in all of about 100 antenna elements. Accordingly, a method has been considered to map a plurality of antenna elements in a single TXRU and to adjust a direction of beam by an analog phase shifter. Such an analog beamforming technique may make only one beam direction throughout the entire band, and there is a disadvantage that frequency selective beamforming is not available.

As a middle form between a Digital BF and an analog BF, B number of hybrid BF may be considered which is smaller than Q number of antenna element. In this case, directions of beams that may be transmitted simultaneously are limited lower than B number; even it is changed according to a connection scheme between B number of TXRUs and Q number of antenna elements.

FIGS. 6 and 7 illustrate a representative connection scheme between a TXRU and an antenna element. More particularly, FIG. 6 exemplifies a sub-array partition model, which is a first TXRU virtualization model option and FIG. 7 exemplifies a full-connection model, which is a second TXRU virtualization model option. In FIGS. 6 and 7, TXRU virtualization model represents a relation between an output signal of a TXRU and an output signal of an antenna element.

As shown in FIG. 6, in the case of the virtualization model in which a TXRU is connected to a sub-array, an antenna element is connected to only a single TXRU. Different from this, in the case of the virtualization model in which a TXRU is connected to all antenna elements, an antenna element is connected to all TXRUs. In these drawings, W represents a phase vector which is multiplied by an analog phase shifter. That is, a direction of analog beamforming is determined by W. Here, mapping between CSI-RS antenna ports and TXRUs may be 1 to 1 (1:1) or 1 to many (1:N).

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is mainly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna should be detected in order to accurately receive the signal. Accordingly, each transmission antenna should have an individual reference signal.

In a mobile communication system, an RS may be basically divided into two types depending on its purpose. There are an RS having a purpose of obtaining channel state information and an RS used for data demodulation. The former has a purpose of obtaining, by a UE, to obtain channel state information in the downlink, and accordingly, a corresponding RS should be transmitted in a wideband, and a UE should be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS should be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement may be provided using such RSs. That is, the DRS is used only for data demodulation, and the CRS is used for the two purposes of channel information acquisition and data demodulation.

The reception side (i.e., UE) measures a channel state based on a CRS and feedbacks an indicator related to channel quality, such as a channel quality indicator (CQI), a precoding matrix index (PMI) and/or a rank indicator (RI), back to the transmission side (i.e., an eNB). The CRS is also called a cell-specific RS. On the other hand, a reference signal related to the feedback of channel state information (CSI) may be defined as a CSI-RS.

In 3GPP LTE(-A) system, it is defined that a UE reports CSI to a BS. Here, the CSI is commonly called for the information that may represent a quality of a radio channel (or also referred to as a link) established between a UE and an antenna port. For example, the CSI may correspond to a rank indicator (RI), a precoding matrix indicator (PMI), and/or a channel quality indicator (CQI), and the like. Here, RI represents rank information of a channel, and this may mean the number of streams that a UE receives through the same time-frequency resource. Since RI is determined with being dependent upon long-term fading of a channel, the RI is fed back from a UE to a BS with a period longer than CQI, generally. PMI is a value that reflects a channel space property, and represents a precoding index that a UE prefers based on a metric such as SINR. CQI is a value that represents signal strength, and means a reception SINR that is obtainable when a BS uses the PMI, generally.

In 3GPP LTE(-A) system, a BS may setup a plurality of CSI processes to a UE, and may receive CSI report for each process. Here, the CSI process may include CSI-RS for signal quality measurement from a BS and CSI-interference measurement (CSI-IM) resource for interference measurement.

The DRS may be transmitted through resource elements if data demodulation on a PDSCH is required. A UE may receive information about whether a DRS is present through a higher layer, and the DRS is valid only in the case that a corresponding PDSCH has been mapped. The DRS may also be called a UE-specific RS or Demodulation RS (DMRS).

FIG. 8 illustrates reference signal patterns mapped to downlink resource block pairs in a wireless communication system to which the present invention may be applied.

Referring to FIG. 8, a downlink resource block pair, a unit in which a reference signal is mapped may be represented in the form of one subframe in a time domain X 12 subcarriers in a frequency domain. That is, in a time axis (an x axis), one resource block pair has a length of 14 OFDM symbols in the case of a normal cyclic prefix (CP) (in FIG. 7(a)) and has a length of 12 OFDM symbols in the case of an extended cyclic prefix (CP) (FIG. 7(b)). In the resource block lattice, resource elements (REs) indicated by '0', '1', '2', and '3' mean the locations of the CRSs of antenna port indices '0', '1', '2', and '3', respectively, and REs indicated by 'D' mean the location of a DRS.

In the case that an eNB uses a single transmission antenna, reference signals for a single antenna port are arrayed.

In the case that an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, in the case that an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing or a multi-user MIMO antenna.

In the case that a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

In an LTE-A system, that is, an evolved and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, in the case that an eNB has four to a maximum of eight downlink transmission antennas in the LTE-A system, RSs for these antenna ports must be additionally defined and designed. Regarding the RSs for the maximum of eight transmission antenna ports, both of the aforementioned RS for channel measurement and the aforementioned RS for data demodulation should be designed.

One of important factors considered in designing an LTE-A system is backward compatibility, that is, that an LTE UE should operate properly also in the LTE-A system, which should be supported by the system. From an RS transmission aspect, in the time-frequency domain in which a CRS defined in LTE is transmitted in a full band every subframe, RSs for a maximum of eight transmission antenna ports should be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement purpose for the selection of MCS or a PMI (channel state information-RS, channel state indication-RS (CSI-RS), etc.) and an RS for the demodulation of data transmitted through eight transmission antennas (data demodulation-RS (DM-RS)).

The CSI-RS for the channel measurement purpose is characterized in that it is designed for a purpose focused on channel measurement unlike the existing CRS used for purposes of measurement, such as channel measurement and handover, and for data demodulation. Furthermore, the CSI-RS may also be used for a purpose of measurement, such as handover. The CSI-RS does not need to be transmitted every subframe unlike the CRS because it is transmitted for a purpose of obtaining information about a channel state. In order to reduce overhead of a CSI-RS, the CSI-RS is intermittently transmitted on the time axis.

In the LTE-A system, a maximum of eight transmission antennas are supported in the downlink of an eNB. In the LTE-A system, in the case that RSs for a maximum of eight transmission antennas are transmitted in a full band in every subframe using the same method as the CRS in the existing LTE, RS overhead is excessively increased. Accordingly, in the LTE-A system, an RS has been separated into the CSI-RS of the CSI measurement purpose of the selection of MCS or a PMI and the DM-RS for data demodulation, and thus the two RSs have been added. The CSI-RS may also be used for a purpose, such as RRM measurement, but has been designed for a main purpose of the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

In order to measure a CSI-RS, a UE should be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB should notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined only for a subcarrier interval $\Delta f=15$ kHz.

RS Virtualization

In mmW band, a PDSCH transmission is available only to a single analog beam direction on a time by analog beamforming. As a result, an eNB is able to transmit data only to a small number of UEs in a specific direction. Accordingly, on occasion demands, analog beam direction is differently configured for each antenna port, and a data transmission may be performed to a plurality of UEs in several analog beam directions simultaneously.

Hereinafter, four sub-arrays are formed by dividing 256 antenna elements into four equal parts, and an exemplary structure in which a TXRU is connected to each sub-array shown in FIG. 9 is described mainly.

FIG. 9 is a diagram illustrating a service area for each TXRU.

When each sub-array includes total 64 (8×8) antenna elements in 2-dimensional array shape, a region corresponding to a horizontal angle area of 15 degrees and a vertical angle area of 15 degrees may be covered by specific analog beamforming. That is, a region in which an eNB is needed to serve is divided into a plurality of areas, and each area is served at a time. In the following description, it is assumed that CSI-RS antenna port and TXRU are mapped in 1-to-1 manner. Accordingly, an antenna port and a TXRU may have the same meaning in the following description.

As shown in an example of FIG. 9a, in the case that all TXRUs (antenna port, sub-array) have the same analog beamforming direction, the throughput of the corresponding region may be increased by forming a digital beam having higher resolution. In addition, the throughput of the corresponding region may be increased by increasing rank of transmission data to the corresponding region.

As shown in FIG. 9b, in the case that each TXRU (antenna port, sub-array) has different analog beamforming direction, a simultaneous data transmission becomes available in a corresponding subframe (SF) to UEs distributed in wider area. For example, among four antenna ports, two of them are used for a PDSCH transmission to UE1 in area 1 and the remaining two of them are used for a PDSCH transmission to UE2 in area 2.

FIG. 9b shows an example that PDSCH 1 transmitted to UE1 and PDSCH 2 transmitted to UE2 are Spatial Division Multiplexed (SDM). Different from this, FIG. 9c shows an example that PDSCH 1 transmitted to UE1 and PDSCH 2 transmitted to UE2 may be transmitted by being Frequency Division Multiplexed (FDM).

Between the scheme of serving an area by using all antenna ports and the scheme of serving several areas simultaneously by dividing antenna ports, in order to maximize cell throughput, a preferred scheme may be changed depending on a RANK and an MCS served to a UE. In addition, a preferred scheme may also be changed depending on an amount of data to be transmitted to each UE.

An eNB calculates cell throughput or scheduling metric that may be obtained when serving an area by using all antenna ports, and calculates cell throughput or scheduling metric that may be obtained when serving two areas by dividing antenna ports. The eNB compares the cell throughput or the scheduling metric that may be obtained through each scheme, and selects a final transmission scheme. Consequently, the number of antenna ports participated in a PDSCH transmission is changed for each SF (SF-by-SF). In order for an eNB to calculate a transmission MCS of a PDSCH according to the number of antenna ports and reflect it to scheduling algorithm, a CSI feedback from a UE proper to it may be requested.

Beam reference signal (BRS) and Beam refinement reference signal (BRRS)

BRSs may be transmitted in at least one antenna port p={0, 1, . . . , 7}. BRS sequence $r_l(m)$ may be defined as Equation 1 below.

$$r_l(m) = \frac{1}{\sqrt{2}}(1-2\cdot c(2m)) + j\frac{1}{\sqrt{2}}(1-2\cdot c(2m+1)),$$ [Equation 1]

$$m = 0, 1, \ldots, 8\cdot(N_{RB}^{max,DL} - 18) - 1$$

In Equation 1, l=0, 1, . . . , 13 may represents an OFDM symbol number. In addition, c(i) represents a pseudo-random sequence generator, and may be initialized by Equation 2 on a starting point of each OFDM symbol.

$$C_{init} = 2^{10}\cdot(7\cdot(n_s+1) +$$ [Equation 2]

$$l' + 1)\cdot(2\cdot N_{ID}^{cell} + 1) + 2\cdot N_{ID}^{cell} + 1,$$

$$n_s = \left\lfloor\frac{l}{7}\right\rfloor,$$

$$l' = l \bmod 7$$

BRRS may be transmitted in maximum eight antenna ports p=600, . . . , 607. A transmission and a reception of BRRS may be dynamically scheduled in a downlink resource allocation in xPDCCH.

BRRS sequence $r_{l,n_s}(m)$ may be defined as Equation 3 below.

$$r_{l,n_s}(m) = \frac{1}{\sqrt{2}}(1-2\cdot c(2m)) + j\frac{1}{\sqrt{2}}(1-2c(2m+1)),$$ [Equation 3]

$$m = 0, 1, \ldots, \left\lfloor\frac{3}{8}N_{RB}^{max,DL}\right\rfloor - 1$$

In Equation 3, ns represents a slot number in a radio frame, l represents an OFDM symbol number in the slot, and c(n) represents a pseudo-random sequence. The pseudo-random sequence generator may be initialized by Equation 4 on a starting point of each OFDM symbol.

$$c_{init} = 2^{10}(7(\bar{n}_s+1)+l+1)(2N_{ID}^{BRRS}+1)+2N_{ID}^{BRRS}+1$$

$$\bar{n}_s = n_s \bmod 20$$ [Equation 4]

In Equation 4, $N_{ID}^{BRRS}$ may be set to a UE through RRC (Radio Resource Control) signaling.

BRS may be transmitted in every subframe, and may be transmitted in different analog beam directions for each port. Such a BRS may be used for an eNB to determine an approximate beam direction for a UE. When an approximate beam direction for a UE is determined based on BRS, an eNB may transmit BRRS for each of more accurate/minute analog beam directions within the determined analog beam direction range, and may determine more accurate analog beam direction.

As such, the name for the reference signal used for determining an analog beam direction for a UE is not limited to the BRS or the BRRS described above, and it is apparent that the name may be substituted by/referred to various reference signals that are usable for performing the same function. For example, the BRS may be substituted by/referred to primary/first CSI-RS, Primary synchronization signal/sequence (PSS), Secondary synchronization signal/sequence (SSS), Synchronization Signal/Sequence (SS) block, NR-PSS, and/or NR-SSS, and the BRRS may be substituted by/referred to secondary/second CSI-RS.

DL Phase Noise Compensation Reference Signal (DL PCRS)

A PCRS associated with xPDSCH may be transmitted in antenna port P=60 or P=61 as it is signaled in a DCI format. The PCRS is existed only in the case that xPDSCH transmission is associated with a corresponding antenna port, and the PCRS in this case may be a valid reference for phase noise compensation. The PCRS may be transmitted only in physical resource blocks and symbols to which corresponding xPDSCH is mapped. The PCRS may be the same in all symbols that correspond to xPDSCH allocation.

For both of the antenna ports P=60, 61, PCRS sequence r(m) may be defined as Equation 5 below.

$$r(m) = \frac{1}{\sqrt{2}}(1-2\cdot c(2m)) + j\frac{1}{\sqrt{2}}(1-2\cdot c(2m+1)),$$ [Equation 5]

$$m = 0, 1, \ldots, \lfloor N_{RB}^{max,DL}/4\rfloor - 1$$

In Equation 5, c(i) represents pseudo-random sequence. The pseudo-random sequence generator may be initialized by Equation 6 on a starting point of each subframe.

$$c_{init} = (\lfloor n_s/2\rfloor + 1)\cdot(2n_{ID}^{(nSCID)}+1)\cdot 2^{16} + n_{SCID}$$ [Equation 6]

In the case that a value for $n_{ID}^{PCRS,i}$ is not provided by a higher layer, $n_{ID}^{(i)} = N_{ID}^{cell}$
Otherwise, $n_{ID}^{(i)} = n_{ID}^{PCRS,i}$ A value of n_SCID may be set to 0, unless it is particularly determined. In xPDSCH transmission, n_SCID may be provided by a DCI formation associated with xPDSCH transmission.

3D MIMO System Using 2D (Dimension)-AAS (Active Antenna System)

FIG. 10 is a diagram illustrating 3D MIMO system using 2D AAS according to an embodiment of the present invention.

Based on LTE standard (Rel-12), as an optimal transmission scheme proper to a single-cell 2D-AAS base station as shown in FIG. 10, the following scheme may be considered.

As illustrated in FIG. 10, as an example of configuring CSI-RS ports from an 8-by-8 antenna array, one precoded CSI-RS port to which 'UE-dedicated beam coefficients' optimized for a specific target UE is applied is configured with respect to each of 8 antennas vertically to configure/transmit a total of 8-port (vertically precoded) CSI-RS horizontally. In this case, the UE may perform CSI feedback for 8 ports like the related art. Consequently, it is transmitted 8-port CSI-RS to which a vertical beam gain optimized for individual UEs (alternatively, specific UE group) is applied (precoded) to the UE, after undergoing the radio channel, and measured by the UE. Accordingly, even though the UE performs the same feedback scheme using a conventional horizontal codebook, the UE may already obtain a vertical beam gain effect of the radio channel through the CSI measurement and reporting operation for the vertically precoded CSI-RS. In this case, a method for determining vertical beams optimized for individual UEs includes a method using an RRM report result by a (vertically precoded) small-cell discovery RS (DRS), a method in which the base station receives the sounding RS (SRS) of the UE in an optimal reception beam direction and converts the corresponding reception beam direction into a DL optimal beam direction by channel reciprocity and applies the DL optimal beam direction, and the like.

When the base station determines that the UE-dedicated best V-beam direction is changed due to the mobility of the UE, the base station needs to re-configure all RRC configurations related with the CSI-RS and an associated CSI process by the convention operation. In this case, RRC-level latency (e.g., by the unit of several tens to several hundreds of ms) inevitably occurs owing to the RRC reconfiguration process. That is, in terms of the network, a target V-beam direction is divided into, for example, four in advance and a separate 8-port CSI-RS having precoding in each V-direction is transmitted at the corresponding separate transmission resource location, and each UE performs CSI measurement and reporting for one specific CSI-RS configuration among 8 port CSI-RSs. Accordingly, when the target V-direction is changed, a network cannot but perform an RRC reconfiguration procedure with the CSI-RS configuration to be changed.

As a method for removing or significantly reducing the RRC-level latency, a technique has been proposed that allocates only a single CSI process and a single UL feedback resource to the UE and indicates what a CSI-RS index (and/or CSI-IM index) to be measured is at not the RRC level but the MAC (Media Access Control) level (or, DCI level). That is, the base station configures multiple candidate CSI-RSs with the RRC-level, and informs the CSI-RS which is "activated" with (MAC-level or DCI level). For example, in a situation in which it is considered whether CSI-RS 1 is transferred to CSI-RS 2, the base station may first indicate a sort of "pre-activation" to the UE so as to "track" CSI-RS 2 before actually indicating a reactivation command to transfer CSI-RS 1 to CSI-RS 2. That is, pre-activated CSI-RS x (x is a natural number) may be actually activated or not activated (within a specific "timer" time). The UE may initiate a CSI reporting within specific y ms (y is an integer) after receiving an activation indication message finally.

In more detail, first, the UE may inform at least one of capability related contents as below in advance (e.g., upon initial connection) as its own capability information via capability signaling.

1. Information regarding the (maximum) number of (Nc) CSI-RSs, the (maximum) number of (Ni) CSI-IMs, and/or the (maximum) number of (Np) CSI-RS processes which may be available to be full activation (configuration).

Herein, an expression of 'full activation (configuration)' means that the base station may actually 'simultaneously' activate/configure all of a total number indicated by the capability information of the UE. For example, for the UE having the capability information configured as Nc=3, Ni=3 and Np=4, the base station may simultaneously configure all of total three CSI-RSs (Nc=3), three CSI-IMs (Ni=3) and four CSI procedures (Np=4) to the corresponding UE. In this case, the UE needs to perform a channel measurement for all of three CSI-RSs, perform an interference measurement for all of three CSI-IMs and perform CSI feedback for four CSI procedures. In this case, all CoMP operations in the convention Rel-11 standard may be supported.

2. Information regarding the (maximum) number of (Nc') CSI-RSs, the (maximum) number of (Ni') CSI-IMs, and/or the (maximum) number of (Np') CSI-RS processes which may be available to be partial activation (configuration).

Herein, an expression of 'partial activation' may mean activation/configuration limited only to specific some operations (e.g., CSI-RS tracking) among the operations which may be performed by the UE upon the 'full activation (configuration)' and/or mean activation/configuration of a separate additional operation.

For example, in the case of the specific UE, parameters (i.e., fully activated (configured) parameter) in Term 1 given above may be set as Nc=1, Ni=1, and Np=1 and simultaneously, the parameters (i.e., partially activated (configured) parameter) in Term 2 given above may show Nc'=3, Ni'=1, and Np'=1. That is, there is only a difference in the number of CSI-RSs between Term 1 and Term 2 (Nc=1 and Nc'=3), for example. This meaning may be construed as a meaning that the specific UE may maintain time/frequency synchronization/tracking with respect to Nc' (=3) "partially activated" CSI-RSs and may be designated with Nc (=1) specific "fully activated" CSI-RS among the three CSI-RSs. The UE may receive an indication of Nc (=1) CSI-RSs in the MAC layer through an MAC CE command, and the like, or may receive a more dynamic indication in the PHY (Physical) layer through the DCI signaling.

Through such an operation, the problem/restriction (RRC latency for CSI-RS reconfiguration) described above may be solved. That is, following the embodiment/operation, since the UE may just perform only single CSI feedback (in a specific CC) for Np=Np' (=1) CSI process through, complexity and overhead of the CSI feedback may be continuously similarly maintained. In addition, there is an advantage that only the CSI-RS index which the UE needs to measure may be dynamically switched through the signaling of the MAC layer or PHY layer. That is, through a signaling having latency smaller than the CSI-RS reconfiguration latency by the RRC signaling, only a resource, which is a measurement target, may be simply switched. In the present specification, for the convenience of description, the CSI-RS is primarily described, but it is apparent that the method proposed in the present specification may be similarly extended and applied even to dynamic switching of the CSI-IM index (or, CSI process index).

In the embodiment described above, there may be an additional restriction/condition of the format below with respect to a size between parameters. In the case that such restriction/condition is existed, the UE needs to transmit the capability information to the base station by signaling it within the extent of satisfying the restriction/condition.

$Nc<=Nc'$, $Ni<=Ni'$, and/or $Np<=Np'$

When the base station receives from the UE the capability signaling, the base station needs to provide the RRC signaling to the UE in such a manner not to violate the capability property combination at the time of configuring the corresponding UE later. Accordingly, the UE does not expect the configuration/RRC signaling in the form of violating the capability property combination and may regard the configuration/RRC signaling in the form of violating as an error case.

The UE exemplified above may be configured with all of three CSI-RSs corresponding to Nc'=3 from the base station through the RRC signaling. However, in this case, the UE may receive a (RRC) signaling to recognize/indicate that the CSI-RS is configured to the 'partial activation (configuration)' state for each CSI-RS (index), which includes a separate identifier a separate identifier or (implicit/explicit) indication. In this case, the UE may perform time/frequency synchronization/tracking for the corresponding 3 CSI-RSs from the time of receiving the RRC signaling. At this time, the UE may perform time/frequency synchronization/tracking of specific information of a specific RS so as to apply a quasi co-location (QCL) assumption included in the each CSI-RS configuration. In this case, it may be additionally (or, simultaneously) configured/indicated that only Nc (=n; n<N, e.g., n=1) specific CSI-RS among Nc' (=N, e.g., N=3) CSI-RSs is 'fully activated' in the form of the separate identifier. Alternatively, implicitly, Nc (=n; e.g., n=1) CSI- RS may be pre-defined as a specific index, such as continuously defining the CSI-RS as a lowest (or highest) indexed CSI-RS in an ascending order (or descending order) as n CSI-RSs. In this way, the specific CSI-RS may be regulated as a CSI-RS having specific index in the standard. Then, the UE may perform the channel measurement for the CSI feedback only with respect to Nc (=n; e.g., n=1) 'full activated (configured)' CSI-RS. That is, the UE performs only the synchronization/tracking without performing the channel measurement with respect to remaining (Nc'−Nc) CSI-RSs.

As such, in a method that performs the channel measurement only with respect to Nc=n specific CSI-RS and derives feedback contents (e.g., RI/PMI and/or CQI) through the measurement, an operation of deriving/calculating the feedback contents with respect to a specific CSI process regulated/configured together with the CSI-RS may be defined/configured. For example, the UE receives even Np=1 specific CSI process from the base station through the RRC signaling and the CSI process is defined as a combination between a specific number of CSI-RSs and the CSI-IM index. However, herein, in the case of the CSI-RS, an operation may be defined/configured, which automatically reflects the fully activated CSI-RS according to what Nc=1 fully activated CSI-RS is to (automatically) recognize the corresponding CSI-RS as a CSI-RS which becomes a target of the channel measurement of the corresponding CSI process.

As another approaching method, similarly, for example, CSI processes may be configured as the partial activation (configuration) state of Np'=N1 (e.g., N1=3), and interlinked with each CSI process, the Nc' N2 (e.g., N2=3) CSI-RS indexes in the respective CSI processes may be configured. Thereafter, the base station may dynamically indicate Np (=n1) (e.g., n1=1) specific fully activated (configured) CSI processes to the UE through the MAC or PHY signaling. In this case, the UE may initiate the CSI feedback for the specific fully activated (configured) CSI process.

Therefore, a separate identifier or specific implicit/explicit signaling method may be defined, which may identify whether the specific CSI-RS (index) and/or CSI-IM (index) linked/indicated with the specific CSI process is a fixed/maintained index or varied (or a variable index). When the specific CSI-RS (index) and/or CSI-IM (index) is fixed and indicated as the specific index, the UE performs measurement of resources corresponding to the fixed CSI-RS (index) and/or CSI-IM index (index). On the contrary, when the specific CSI-RS (index) and/or CSI-IM (index) is configured as the variable index type, in the case where Nc=1 CSI-RS is 'fully activated (configured)' through the separate MAC or PHY signaling as described above, the corresponding index may be automatically applied. Herein, the number of fully activated (configured) number of CSI-RS may be two or more (i.e., Nc≥2) (e.g., as a purpose of measuring together/simultaneously multiple CSI-RS resources in the 2D-AAS structure through a Kronecker operation and the like). Even in this case, the fully activated (configured) CSI-RS (index) may be separately dynamically indicated, and even in this case, the UE may apply the corresponding CSI-RSs (indexes) in CSI process automatically.

Consequently, the CSI-RS index and/or CSI-IM index which may be indicated in the corresponding CSI procedure configuration needs to be defined from the RRC configuration step, which may be selected/configured from a certain candidate set.

Identically/similarly, it is apparent that the operation/embodiment depending on the numbers of Ni's and Nis may be applied even to the CSI-IM. (i.e., it may be replaced in the way: CSI-RS→CSI-IM, Nc→Ni, Nc'→Ni'.).

In the case that MAC or PHY signaling in which a specific CSI-RS (index), CSI-IM (index) and/or CSI procedure process (index) is received in # n SF time, the UE may initiate/apply the operation after y ms from the corresponding time, that is, according to the signaling received from # (n+y) SF time.

In the case of the periodic CSI reporting, the UE may initiate a CSI measurement and report for a specific CSI-RS (index), CSI-IM (index) and/or CSI procedure process (index) which are newly fully activated (configured) from a specific reference resource time linked with an RI reporting instance which exist after the SF # (n+y) time. That is, with respect to valid reference resource times which exist after the SF # (n+y) time, the CSI (e.g., RI/PMI/CQI) calculated at the reference resource time may be defined to report new CSI contents from the time when the RI is initially reported. That is, before the initial RI reporting time, even though the PMI/CQI reporting instance exists, the CSI feedback contents based on not the newly full activated configuration but the configuration which is followed just before the first RI reporting time need to be continuously reported. Consequently, the UE may perform/initiate the CSI reporting based on the fully activated (configured) from the new RI reporting instance time (even after receiving fully activated (configured) signaling).

In the above operations, configuration information related with a window that averages the CSI measurement may be defined to be provided through the RRC signaling separately or together (particularly, Further, such an operation may be defined only with respect to an enhanced UE that supports a configuration of a type such as the full/partial activation (configuration)). In this case, the conventional unrestricted observation is not permitted but the measurement averaging may be allowed to the UE within a specific period (i.e., window) such as [d1, d2] ms. The reason is that since the resource configuration information of the CSI-RS and/or CSI-IM to be measured may be dynamically switched through the MAC or PHY signaling, the measurement averaging may be preferably defined to be performed only within a specific bounded/limited interval.

In this case, the configuration information of the CSI-RS and/or CSI-IM resource to be measured is dynamically switched/indicated through the MAC or PHY signaling (e.g., by DCI), an operation of the UE of initializing/updating/resetting the measurement averaging window for CSI-RS-based channel measurement in link with the signaling may be regulated/configured. And/or, interlinked with the signaling, an operation of the UE of initializing/updating/resetting the measurement averaging window for CSI-IM-based interference measurement in link with the signaling may be regulated/configured. Herein, 'initializing/updating/resetting the measurement averaging window' means initializing/updating/resetting a "start point of the measurement window" called the 'from the predetermined time' again from # n SF or after a specific configured/indicated time (e.g., # n+k SF), the time of receiving the (dynamically switched/indicated) signaling instead of, for example, a conventional operation of averaging channel measurement values from the corresponding CSI-RS ports, which are repeatedly measured up to now from a predetermined past time according to a UE implementation by "unrestricted observation" for CSI in measurement according to a current standard. Alternatively, a scheme that explicitly signals time information (e.g., timestamp type) representing from which time the corresponding measurement window is initialized or updated together may also be applied. For example, the scheme may include a time information indicating method for absolute time parameter values including SFN, slot number, and the like or a scheme that indicates the signaling in a specific +/− differential/Delta value type from the time when the UE receives the signaling (e.g., in the case that a specific time is # n+k SF, '+k').

In other words, it may be limited that the signaling (i.e., signaling for configuration information with respect to CSI-RS and/or CSI-IM resource) serves to initialize/update/reset only the start time of only the measurement averaging window. Then, the UE may average the CSI measurement values (according to the UE implementation) until the additional signaling is received after the corresponding time.

And/or the signaling (i.e., signaling for configuration information with respect to CSI-RS and/or CSI-IM resource) may be separately/independently signaled for each CSI process. Therefore, the measurement window initialization/update/reset may be independently applied/performed for each process.

And, the signaling (i.e., signaling for configuration information with respect to CSI-RS and/or CSI-IM resource) may be used for initializing/updating/resetting the interference measurement averaging window for the specific CSI-IM resource. In this case, the signaling serves to initialize/update/reset the measurement averaging window for the CSI-RS and the CSI-IM that belong to/associated with the CSI process simultaneously/together. Alternatively, a scheme that signals a separate/independent indicator for initializing/updating/resetting the interference measurement averaging window for the CSI-IM resource may also be applied. This informs the UE to initialize/update/reset the measurement averaging window for the specific CSI process so as to separate a past interference environment not to be reflected to the interference measurement value from a current time any longer, when an interference environment which may be predicted/sensed by the base station is changed in an environment (e.g., eICIC, eIMTA, LAA, etc.) in which the interference environment is changed.

CSI Acquisition Framework

Hereinafter, it is proposed a framework for CSI acquisition which may be applied to 3GPP LTE and/or NR system. However, this is not limited thereto, but extendedly applicable to various wireless communication system (e.g., UTRA, etc.).

The following DL L1 (Layer 1)/L2 (Layer 2) beam management procedure may be supported in one or multiple TRPs.

P-1 (procedure): P-1 may be used to enable a UE measurement on different TRP Tx beams to support selection of TRP transmission (Tx) beams/UE reception (Rx) beam(s). For beamforming at TRP, it typically includes a intra/inter-TRP Tx beam sweeping from a set of different beams (or using a set constructed by different beams). For beamforming at UE, it typically includes a UE Rx beam sweeping from a set of different beams (or using a set constructed by different beams). TRP Tx beam and UE Rx beam may be determined jointly or sequentially. In the case that it is determined sequentially, for example, after TRP TX beam is determined first, UE RX beam may be determined based on the determined TRP Tx beam.

P-2 (procedure): P-2 may be used to enable UE measurement on different TRP Tx beams to possibly change/determine inter/intra-TRP Tx beam(s). That is, since such P-2 is for the purpose for a UE to determine optimal/proper TRP Tx beam(s), different TRP Tx beams are measured (more particularly, RS transmitted through different TRP Tx beams are measured), and a repeated measurement for the same TRP Tx beam is not performed. Accordingly, when P-2 is configured, within same/one RS resource set, the Tx beam to which RS (e.g., CSI-RS) resources are transmitted/mapped may be different for each resource. At this time, the RX beam used to measure different TRP Tx beam(s) may be fixed to the same beam, which may correspond to the RX beam determined/selected in P-3 described below.

Such P-2 may be configured to a UE through RRC signaling. For example, P-2 may be configured/indicated to a UE in such a way that ResourceRep (or CSI-RS-ResourceRep) RRC p arameter' is configured/indicated as 'off'. Here, the 'ResourceRep RRC parameter' may correspond to an RRC parameter indicating whether 'repetition is on/off'. In the case that the 'ResourceRep RRC parameter' indicates repetition on (i.e., the parameter is configured as on), a UE may assume that a base station maintains Tx beam which is fixed to each RS resource in the same RS set. In the case that the 'ResourceRep RRC parameter' indicates repetition off (i.e., the parameter is configured as off), a UE may assume that a base station does not maintain Tx beam which is fixed to each RS resource in the same RS set. At this time, the ResourceRep RRC parameter in the case that the RS is a CSI-RS may be referred to as 'CSI-RS-ResourceRep RRC parameter'. CSI-RS-ResourceRep parameter associated with a CSI-RS resource set defines whether a repetition in conjunction with spatial domain transmission filter is ON/OFF at gNB-side.

In the case that the UE is configured with the higher-payer parameter CSI-RS-ResourceRep is set to 'OFF', the UE may not assume that the CSI-RS resources within the resource set are transmitted with the same downlink spatial domain transmission filter and with same number of ports in every symbol.

In such P-2, a UE measurement may be performed for smaller Tx beam set (i.e., a beam set of smaller range) than P-1 for more refined beam refinement. Accordingly, P-2 may be regarded as a special case of P-1.

P-3 (procedure): P-3 may be used to enable UE (repeated) measurement on the same TRP Tx beam to determine/change UE Rx beam in the case that UE uses beamforming. That is, since such P-3 is for the purpose for a UE to determine optimal/proper Rx beam, the same TRP 'Tx' beams may be measured/received 'repeatedly' using different 'Rx' beam (more particularly, RS transmitted through different TRP Tx beams are measured). At this time, the same TRP 'Tx' beam repeatedly measured may be Tx beam which is determined/selected in advance through P-2. Accordingly, when P-3 is configured, the Tx beam in which RS (e.g., CSI-RS) resources are transmitted/mapped in the same RS resource set may be the same for each resource.

Such P-3 may be configured to a UE through RRC signaling. For example, P-3 may be configured/indicated to a UE in such a way that ResourceRep (or CSI-RS-ResourceRep) RRC parameter' is configured/indicated as 'on'.

In the case that the UE is configured with the higher-layer parameter CSI-RS-ResourceRep set to 'ON', the UE may assume that the CSI-RS resources within the resource set are transmitted with the same downlink spatial domain transmission filter, where the CSI-RS resources in the resource set are transmitted in different OFDM symbols. In addition, the UE is not expected to receive different periodicity in CSI-RS-timeConfig and NrofPorts in every CSI-RS resource within the set.

Procedures P-2 and P-3 may be performed jointly (or sequentially) and/or in multiple times to attain the purpose of simultaneous change of TRP Tx beam and UE Rx beam. In procedure P-3, physical layer procedure may be existed or not. In addition, multiple Tx/Rx beam pair management may be supported for a UE.

The procedures described above may be applied to entire frequency range, and may be used in single/multiple beams for each TRP.

Hereinafter, UL beam management procedure is described. The UL beam management procedure may be defined in the similar manner to the DL beam management procedure described above, and may be classified into the following types, largely.

U-1 (procedure): U-1 may be used to enable TRP measurement on different UE Tx beams to support selection of UE Tx beam/TRP Rx beam. Such U-1 may correspond to P-1 described above.

U-2 (procedure): U-2 may be used to enable TRP measurement on different TRP Rx beams to possibly change/select inter/intra-TRP Rx beam(s). Such U-2 may correspond to P-2 described above.

U-3 (procedure): U-3 may be used to enable (repeated) TRP measurement on the same TRP Rx beam to change UE Tx beam in the case UE uses beamforming.

With respect to such procedures, an indication of information related to various Tx/Rx beam conformity/correspondence.

The UL beam management may be performed based on the following channel/RS.

PRACH

SRS

DM-RS

For the case of TRP and UE may have Tx/Rx beam correspondence/conformity. Alternatively, for the case of TRP may have no Tx/Rx beam correspondence/conformity and/or UE may have no Tx/Rx beam correspondence/conformity.

A UE may be configured for CSI acquisition with the following features:

N≥1 CSI reporting settings, M≥1 RS settings, J≥1 IM settings, and a CSI measurement setting which links the N CSI reporting settings with the M RS settings and J IM settings (may be referred to as 'measurement link')

A CSI reporting setting includes at least the following:

Time-domain behavior: aperiodic or periodic/semi-persistent

Frequency-granularity, at least for PMI and CQI

CSI parameters which are reported (If PMI is reported, PMI Type (Type I or II) and codebook configuration)

An RS setting includes at least the following:

Time-domain behavior: aperiodic or periodic/semi-persistent

RS type which encompasses at least CSI-RS

RS resource set(s) of K resources

An IM setting includes at least the following:

Time-domain behavior: aperiodic or periodic/semi-persistent

IM types which encompasses CSI-IM

RS setting and IM setting may be merged

A CSI measurement setting includes at least the following:

One CSI reporting setting

One RS setting

One IM setting

For CQI, reference transmission scheme setting

That is, CSI measurement setting performs a function of inter-connecting a specific CSI reporting setting, a specific RS setting and/or a specific IM setting, and a UE may regard the CSI reporting setting, the RS setting and/or the IM setting configured through a single CSI measurement setting as being associated/related.

A UE may be configured with multiple CSI measurement settings including dynamic indication to select a preferred CSI measurement setting (Including selection of a specific resource out of the K resources within an RS setting).

A UE may support up to L CSI measurements, and the L value may depend on the capability of the UE.

NZP CSI-RS resource is defined in NR, as a set of NZP CSI-RS port(s) mapped to a set of REs within a frequency span/a time duration which is measured at least to derive a CSI. Multiple NZP CSI-RS resources may be configured to UE at least for supporting CoMP and multiple beamformed CSI-RS based operations. At this time, each NZP CSI-RS resource at least for CoMP may have different number of CSI-RS ports.

QCL assumptions within a NZP CSI-RS resource, or among two or more resources.

A single NZP CSI-RS resource may be used to derive two or more CSIs, and multiple NZP CSI-RS resources may be used to derive a single CSI.

CSI-RS supports the DL Tx beam sweeping and UE Rx beam sweeping. At this time, CSI-RS may be used in P1, P2 and P3.

NR CSI-RS may support the following mapping structure:

NP CSI-RS port(s) may be mapped per (sub) time unit. Across the (sub) time units, the same CSI-RS antenna ports may be mapped. Here, the "time unit" refers to n≥1 OFDM symbols in a configured/reference numerology. The OFDM symbols including a time unit may be located consecutively or inconsecutively on time-frequency domain. As a port multiplexing method, FDM, TDM, CDM, or various combinations thereof may be existed.

Each time unit may be partitioned into sub-time units. The Partitioning method may include, for example, TDM, Interleaved FDMA (IFDMA), OFDM symbol-level partition with the same as or shorter than OFDM symbol length (i.e. larger subcarrier spacing) the reference OFDM symbol length (subcarrier spacing), and other methods are not precluded.

This mapping structure may be used for supporting multiple panels/Tx chains.

The following CSI-RS mapping options may exist for Tx and Rx beam sweeping.

1. Option 1: Tx beam(s) are the same across sub-time units within each time unit. Tx beam(s) are different across time units.

2. Option 2: Tx beam(s) are different across sub-time units within each time unit. Tx beam(s) are the same across time units.

3. Option 3 (combination of option 1 and option 2): Within one time unit, Tx beam(s) are the same across sub-time units. Within another time unit, Tx beam(s) are different across sub-time units. A combination of the different time units in terms of number and periodicity may be available.

Only either one of Tx sweeping or Rx sweeping may be available. The above mapping structure may be configured with one or multiple CSI-RS resource configurations.

1. RS Setting

According to the description above in relation to supporting CSI-RS for DL Tx/Rx beam sweeping, NR should define following two different types of NZP CSI-RS resources in terms of their different operational purpose (i.e., Type 1 for MIMO CSI feedback, and Type 2 for DL beam management). Accordingly, the present disclosure is to propose to define two different types of NZP CSI-RS resources in terms of their different operational purpose (i.e., Type 1 for MIMO CSI feedback, and Type 2 for DL beam management).

1.1. Type 1 CSI-RS resource (for MIMO CSI feedback)

Type 1 CSI-RS resource may be based on the same structure defined in LTE especially for MIMO CSI feedback functionality developed from FD-MIMO and eFD-MIMO WI. In other words, when a UE is configured with a Type 1 CSI-RS resource, the resource is not configured with any (sub) time unit related granularity, but with time periodicity/offset (if configured, e.g., for periodic CSI-RS) similar to LTE. Also, according to the measurement setting linking to this RS setting (similar to the CSI process concept in LTE), the CSI-RS ports (or the number of CSI-RS ports) configured in the Type 1 CSI-RS resource may be measured together to derive corresponding CSI including CRI (if Class B K>1 configured), RI, PMI, and CQI.

Accordingly, Type 1 CSI-RS resource may be at least to be used for MIMO CSI feedback related reporting and other various usage cases.

1.2. Type 2 CSI-RS Resource (for DL Beam Management

Type 2 CSI-RS resource may be newly introduced in order to support the DL Tx beam sweeping and UE Rx beam sweeping in NR. Each time unit can be partitioned into sub-time units, and NP CSI-RS port(s) may be mapped per (sub) time unit, and the same CSI-RS antenna ports are mapped across (sub) time units.

Regarding the mentioned three options to map CSI-RS for Tx and Rx beam sweeping, it is sufficient to select only Option 1, which is written as follows and is sufficiently supporting the identified DL beam management procedures P-1, P-2, and P-3 without introducing other options.

Option 1: Tx beam(s) are the same across sub-time units within each time unit. Tx beam(s) are different across time units.

In addition, Type 2 CSI-RS resource may be used mainly for DL beam management related reporting, and at this time, the necessary reporting contents are discussed below with reference to FIG. 11. Accordingly, Type 2 CSI-RS resource may be at least used for DL beam management related reporting, and other usage cases.

Regarding another issue on whether the above mapping structure is configured with one or multiple CSI-RS resources, it may be proposed to allow multiple Type 2 CSI-RS resources configurable for a UE, with clarifying that each configured CSI-RS resource corresponds to a time unit. In addition, multiple OFDM symbols (e.g., represented by sub-time units) may be configured within the CSI-RS resource only when above Option 1 is applied across sub-time units (for UE Rx beam sweeping purpose).

Accordingly, in the present disclosure, it is proposed to allow multiple Type 2 CSI-RS resources configurable for a UE. At this time, each configured CSI-RS resource may correspond to a time unit. Further, multiple OFDM symbols (e.g., sub-time units) may be configured within the CSI-RS resource, only when the above Option 1 is applied across the multiple sub-time units.

The QCL indication required for Type 2 CSI-RS resource may be proposed in consideration with initial access related discussions. In order to support reasonable UE complexity in RX beam searching, such Type 2 CSI-RS resource needs to be configured with proper QCL linkage to MRS-x or SS block (depending on decisions related to initial access).

FIG. 11 is a diagram illustrating necessary QCL linkages/relations regarding Type 2 CSI-RS resources according to an embodiment of the present invention. Particularly, FIG. 11 describes necessary QCL linkages/relations regarding Type 2 CSI-RS resources in consideration that a TXRU used for the CSI-RS transmission is at least to be used for the signal transmissions within the SS block in an SF block manner.

Referring to FIG. 11, the UE may be configured with four Type 2 CSI-RS resources by RRC, but only resource #1 and #4 may be activated by MAC CE (by a similar procedure defined in eFD-MIMO as activation/release for NZP CSI-RS resources, "semi-persistent CSI-RS" in NR context). With this L2-level activation mechanism, Type 2 CSI-RS resource overhead may be reasonably controlled by gNB implementation, and UE-side complexity reduction for DL beam management may be achieved together.

Accordingly, in order to support reasonable UE complexity in RX beam searching, Type 2 CSI-RS resource needs to be configured with proper QCL linkage/relation to an MRS-1 or SS block for at least spatial QCL parameter (beam range/angle related QCL parameter). In addition, With L2-level activation/release mechanism on Type 2 CSI-RS resources, network-side RS overhead and UE-side complexity reduction for DL beam management may be achieved together.

2. IM Setting

Regarding whether RS setting and IM setting may be merged or not, the RS setting and the IM setting should be separated, unless all possible IM methods supported in NR may be operated based on only the configured RS settings (e.g., all IM methods are based on using/abstracting NZP CSI-RSs configured in RS settings). However, at least CSI-IM based IM methods need to be supported in NR, which is based on separated IM resources configured by gNB, and the separated J (≥1) IM settings are reasonable and beneficial in flexibility to be indicated by measurement settings.

Accordingly, the present disclosure is to propose to separate RS setting and IM setting considering at least CSI-IM based IM method needs to be supported in NR, and for supporting flexible measurement settings including combinations between aperiodic/semi-persistent/periodic CSI-RS setting and aperiodic/semi-persistent/periodic IM setting.

3. Measurement Setting

As described above, allowing flexible measurement settings is desirable for NR, which may include supporting any combinations between aperiodic/semi-persistent/periodic CSI-RS setting and aperiodic/semi-persistent/periodic IM setting. More specifically, considering semi-persistent or periodic CSI reporting, semi-persistent or periodic IM resource may need to be considered to avoid or minimize L1/L2 control signaling. Also, aperiodic CSI-RS setting may be associated with semi-persistent or periodic IM resource for aperiodic CSI reporting. On the contrary, semi-persistent or periodic CSI-RS may be associated with aperiodic IM resource for aperiodic CSI reporting. Besides, since periodic and semi-persistent CSI reporting cases are also available, all kinds of possible combinations need to be investigated to narrow-down necessary combinations to be supported for measurement setting configurations.

All kinds of possible combinations among aperiodic/semi-persistent/periodic CSI reporting, aperiodic/semi-persistent/periodic CSI-RS, and potential aperiodic/semi-persistent/periodic IM resources need to be investigated to narrow-down necessary combinations to be supported for measurement setting configurations.

4. Reporting Setting

All of aperiodic, semi-persistent, and periodic CSI reporting may be supported in NR. According to a measurement setting configuration described above, proper CSI reporting contents are needed to be defined.

In the case that Type 1 CSI-RS resource is indicated in a certain measurement setting, the baseline for the corresponding reporting contents should be the existing CSI report types supported in LTE including outcomes from eFD-MIMO WI.

In the case that Type 2 CSI-RS resource is indicated in a certain measurement setting, the corresponding reporting contents should be decided based on necessary reporting contents for supporting DL beam management. As illustrated in FIG. 11, each CSI-RS port within a Type 2 CSI-RS resource may correspond to a different analogue beam, so that the corresponding reporting contents may be a paired information type as {CRI, port index} for reporting a preferred beam direction information. In addition to the beam related information, corresponding beam gain related metric may need to be reported together for which the details of the metric including RSRP, RSRQ, or CQI type of contents need further research.

In the case that Type 2 CSI-RS resource(s) is/are indicated in a certain measurement setting, at least preferred beam direction information corresponding to a CSI-RS port within a configured Type 2 CSI-RS resource needs to be reported, and corresponding beam gain related metric may need to be reported together.

Proposal of Setting/Configuration for CSI Acquisition

FIG. 12 is a diagram illustrating a CSI-RS transmission scheme according to an embodiment of the present invention. Particularly, FIG. 12(a) illustrates Type 1 CSI-RS transmission scheme and FIG. 12(b) illustrates Type 2 CSI-RS transmission scheme.

Referring to FIG. 12(a), the existing CSI-RS configuration scheme follows a structure that a CSI-RS port number and/or sequence generation/scrambling parameter is generated, and a specific period/offset is configured (omitted for aperiodic CSI-RS, etc.), and frequency/time resource position (e.g., CSI-RS RE position/pattern) in which CSI-RS is transmitted on each CSI-RS transmission instance is configured in advance (through RRC signaling). Hereinafter, CSI-RS that follows such scheme/structure is referred to as 'Type 1 CSI-RS', for the convenience of description.

On the other hand, referring to FIG. 12(b), as described above, a specific CSI-RS resource configuration may be further divided by configuration related to "(sub) time unit", and detailed operation option, and the like of a UE for (sub) time unit may be further configured. Hereinafter, CSI-RS that follows such configuration is referred to as 'Type 2 CSI-RS' for the convenience of description.

As illustrated in FIG. 12(b), like Type 1 CSI-RS, basically, a period/offset parameter may be configured to Type 2 CSI-RS (or, explicit configuration of a period/offset parameter is omitted, and it is also available a scheme that a period/offset parameter is implicitly configured based on the time when every time unit appears, for example, it may be configured/limited in the form that multiple time units are consecutively appears in bursty manner, and this may be linked with aperiodic CSI-RS configuration and the corresponding CSI-RS burst starting time, and the like may be configured/indicated), and an additional (time unit offset) parameter may be configured together, which explicitly indicates a detailed transmission time within the corresponding (sub) time unit based on every CSI-RS transmission time indicated by the configured period/offset parameter. And/or (as a default configuration method) every CSI-RS transmission time may be defined/configured/limited as a starting time of every time unit (as shown in FIG. 16(b)).

In a time unit, multiple sub time units may be configured. The sub time units may be limited to be consecutively positioned/configured for all times (within a time unit) as shown in FIG. 12(b). Alternatively, more flexibly, such that sub time units may be configured with additional period/offset in a single time unit, the related parameters may be configured together. As another method, far more flexibly, indication information (e.g., indication information of bit-map format) indicating a position of a sub time unit within a time unit may be configured together. In this case, since a position configuration support of a sub time unit is available irregularly, there is an advantage that flexibility of resource utilization is higher.

Hereinafter, it is described, in which format such Type 1 and Type 2 CSI-RSs may be configured to a UE, and in conjunction with this, which type of restriction condition may be provided to CSI-IM/measurement/report setting(s) and the related operation. Further, an efficient CSI acquisition operation based on it is proposed.

[RS Setting Method #1]—

Type 1 and Type 2 CSI-RSs are explicitly configured with being divided (detailed linked operation according to each type is also defined/configured depending on it).

According to RS setting method #1, in the case that a UE is configured with RS setting related configuration, at least one RS setting may be configured by using/via identifier/ID (e.g., RS setting #1, #2, etc.) for identifying a specific RS setting.

Assuming that a UE is configured with RS setting #1 and RS setting #2, each RS setting may be independently/separately configured as exemplified below.

RS setting #1 is configured with a form in which a parameter such as (sub) time unit and the like is 'not existed/not indicated'.

In this case, RS setting #1 is similar to the existing scheme, and a separate identifier for informing that RS setting #1 is Type 1 CSI-RS form may be configured together. Alternatively, a UE may identify that RS setting #1 is Type 1 CSI-RS form based on the fact that a parameter related to (sub) time unit is not configured implicitly without any separate identifier.

RS setting #1 may be limited to MIMO CSI feedback purpose. For example, RS setting #1 may be connected/associated only with reporting setting in the form in which CRI (CSI-RS Resource Indicator), RI (Rank Indicator), PMI (Precoding Matrix Indicator), and/or CQI (Channel Quality Indicator), and the like are included. And/or such RS setting #1 may be limited to be necessarily indicated together with an assumption including at least one specific IM setting and/or assumption including Tx scheme for deriving CQI (since it is for the purpose of deriving MIMO CSI) in a measurement setting. Accordingly, in the measurement setting, only the configuration which is not against to it is necessarily available, and a UE may not expect a configuration against to it.

RS setting #2 is configured with a form in which a parameter such as (sub) time unit and the like is 'existed/indicated'.

In this case, a separate identifier for informing that RS setting #2 is Type 2 CSI-RS form may be configured together. Alternatively, a UE may identify that RS setting #2 is Type 2 CSI-RS form based on the fact that a parameter related to (sub) time unit is configured implicitly without any separate identifier.

At this time, RS setting #2 may be limited to be used/applied for the purpose of P-1, P-2 and/or P-3 beam management. For example, RS setting #2 may be connected/linked with a limited reporting setting such that a UE reports CRI only (and/or reporting related to signal quality in which the corresponding CQI beam gain is reflected). And/or, RS setting #2 may be connected/linked with a reporting setting in the form of reporting preference in a reception signal quality aspect for CSI-RS measured in a specific time such as a separate beam ID reporting (only when a beam ID is defined) or a desired (sub) time unit index reporting. And/or, RS setting #2 may be connected/linked with a reporting setting in the form that a UE reports a long-term RS power value (and/or a long-term RS reception quality value considering amount of interference such as RSRQ (Reference Signal Received Quality)) such as RSRP (Reference Signal Received Power) (per port or per port group) of RS (e.g., CSI-RS). When calculating a metric of RSRQ form, the UE performs an interference measurement via IM setting connected/linked with a configured RS setting. At this time, in the case that a metric of RSRQ form is configured so as to be calculated with a specific port (or port group) unit, the IM resource connected/linked per corresponding port (or port group) unit may be independently/separately configured. Since a beam applied per port (or port group) unit may be different, as such, by independently configuring IM resource/setting per port (or port group) unit, flexibility or efficiency may be increased.

In the case that a UE is configured to calculate a metric of RSRQ form for P-3 beam management purpose, the configured IM resource is required to be repeated for UE beam scanning/sweeping, and the IM setting in which such repetition is considered may be supported. For example, even in the IM setting, it may be supported that multiple times divided by (sub) time unit in Type 2 form may be configured. At this time, more distinctively, the resource position of RS setting and IM setting interconnected/interlinked may be limited to only the form of being configured with resource position of the same time (or specific n consecutive times) (e.g., (only) FDM is applicable, etc.). Such detailed proposal operations may be extendedly applied to various embodiments (particularly, RS setting method #2, etc.) described below.

And/or, in the case that RS setting #2 is at least used/applied to P-3 beam management purpose (e.g., purpose of reception beam determination of a UE), it may be limited that RS setting #2 is not connected to (specific or all) IM setting in a measurement setting and/or (specific or all) reporting setting, and a UE may not expect other configuration. That is, this is defined/configured with "RS setting only" mode form and the corresponding mode is triggered, or a configuration in the form of "measurement setting with no reporting and/or IM settings" may be separately provided.

That is, a UE to which CSI-RS measurement is configured/indicated for at least P-3 beam management purpose may measure CSI-RS resources transmitted via the same Tx beam, but may not report any CSI (e.g., CRI, RI, PMI and/or CQI) therefor to a base station. On the contrary, a UE to which CSI-RS measurement is configured/indicated for P-1 or P-2 beam management purpose may measure CSI-RS resources transmitted via different Tx beams, and report the CSI (particularly, CRI) according to the measurement result to a base station. This may be represented that a UE that is configured with/receives ResourceRep (or CSI-RS-ResourceRep) RRC parameter' configured with 'on' may not report any CSI to a base station, and a UE that is configured with/receives ResourceRep (or CSI-RS-ResourceRep) RRC parameter' configured with 'off' may report the CSI (particularly, CRI) according to the measurement result of RS (e.g., CSI-RS) to a base station. The reason is, as described above, that P-1 and P-2 procedures are on the purpose of selecting a best Tx beam by a base station (i.e., selection subject is the base station), and it required CSI feedback of a UE. However, since P-3 procedure is on the purpose of selecting a best Rx beam by a UE (i.e., selection subject is the UE), CSI feedback is not necessarily required. However, this is not limited thereto, even in the case of being configured/indicated for the purpose of P-3 beam management, the UE may report CSI to the base station according to an embodiment, as described above.

Accordingly, ReportQuantity' RRC parameter indicating 'No report' may be configured/indicated to the UE to which CSI-RS measurement is configured/indicated for P-3 beam management purpose. Here, the ReportQuantity' RRC parameter may correspond to an RRC parameter indicating CSI related information that the UE needs to report.

Whether each UE supports/implements Type 1 CSI-RS (for each/specific frequency/carrier) in advance (e.g., in initial access) and/or supports/implements Type 2 CSI-RS may be informed to a base station (e.g., via UE capability signaling, etc.), and the base station may be limited to support only the CSI-RS that the UE may support/implement. Alternatively, it may be ruled that a UE needs to support/implement Type 1 CSI-RS, and in this case, the UE may inform whether to support/implement Type 2 CSI-RS separately. And/or, whether a UE support/implement P-1, P-2 and/or P-3 beam management related operation (and/or support/implement UL beam management procedure related operation including specific U-1, U-2 and/or U-3 described above) may be informed to a base station with a UE capability signaling form, and the like, and based on it, the base station may be limited to configure the UE within the operation for the UE available to support/implement.

And/or, a base station may inform whether only Type 1 CSI-RS is supported or only Type 2 CSI-RS is supported via a higher layer signal such as RRC signaling (for each/specific frequency/carrier), or whether Type 1 and Type 2 CSI-RS is configured with mixed/combined manner as in the above example with UE-specific configuration (for each frequency/carrier). By doing it, it is available to support an operation of semi-static switching of whether to configure CSI-RS of a specific type(s). Such an operation may act more efficiently in a structure that a particular CSI-RS configuration is controlled at an RRC level or lower (e.g., MAC CE and/or L1 signaling, etc.), specifically. That is, a base station may configure a CSI-RS type in advance with an RRC level, and then may be able to change/update detailed parameter associated/related with CSI-RS only of the type(s) configured with the RRC level when controlling/switching the detailed parameter with MAC CE for each CSI-RS configuration, and accordingly, there is an effect that an implementation complexity of the UE is guaranteed with a certain level or lower.

[RS Setting Method #2]—

Under a specific condition (e.g., for eMBB (enhanced Mobile BroadBand) service, in a case that a beam management related operation is configured, etc.) or in a specific system (e.g., NR), it is limited that only Type 2 CSI-RS may be defined/configured/supported always.

According to RS setting method #2, in the case that a UE is configured with RS setting related configuration, at least one RS setting may be configured by using/via identifier/ID (e.g., RS setting #1, #2, etc.) for identifying a specific RS setting, similar to RS setting method #1 described above. However, RS setting method #2 is characterized that CSI acquisition operation of various forms is configurable according to a configuration method in measurement/reporting setting only with more reduced number of RS settings in comparison with RS setting method #1 as it is described in the following embodiment. That is, in the case of RS setting method #2, RS setting may be configured with maximum versatility/widely/to the minimum (for this, it is limited that only Type 2 CSI-RS is configurable in a specific condition/system), but a detailed parameter in accordance with a use is configured in the associated measurement/reporting setting, and accordingly, RS setting of more flexible form is available.

As an embodiment for RS setting method #2, a UE is configured with only a specific RS setting method #1 integrally, all of the purpose of RS setting methods #1 and #2 exemplified in RS setting method #1 may be attained.

FIGS. 13 and 14 are diagrams illustrating an RS setting method according to an embodiment of the present invention.

RS setting method #1 may be configured with a form in which a parameter such as (sub) time unit is existed/configured/indicated. This is designed such that RS setting #1 is used commonly for the purpose of MIMO CSI feedback as well as P-1, P-2 and/or P-3 beam management purpose.

As exemplified in FIGS. 13 and 14, in such RS setting method #1, basically, at least one of the followings may be configured: CSI-RS port number, CSI-RS RE position/pattern, sequence generation/scrambling parameter, QCL related parameter, period/offset related parameter, time/sub-time unit related parameter (e.g., parameter related to number of sub time unit existed in a time unit such as interval/starting point/end point of a time unit based on CSI-RS time according to every CSI-RS period, length/position of each sub time unit, and the like (e.g., whether it is consecutive in a time unit or periodic or located irregularly indicated by bitmap form)). It is characterized that more detailed/particular CSI-RS port allocation information (TDM, FDM and/or CDM) for the configured RE pattern), port numbering information, and the like are not configured in the corresponding RS setting. And/or, CSI-RS port number information may not be configured in the corresponding RS setting, and later, through a measurement setting and the like, a particular configuration may be provided.

That is, only the RE position information in which CSI-RS is transmitted is configured first representatively through the RS setting, and the port/sequence/signal actually transmitted on the corresponding RS positions may be flexibly configured via a measurement setting, and the like.

Later, in the case that the RS setting is associated/linked with P-1, P-2 and/or P-3 beam management purpose in a measurement setting, it may be limited that "No CDM (on time-domain)" is applied to each configured CSI-RS port as exemplified in FIG. 13, for example. In FIG. 13, in the resources units denoted by small rectangles having different patterns, different CSI-RS ports may be transmitted (i.e., each CSI-RS port is transmitted only in a specific single sub time unit). As such, TDM, not CDM, is applied to each CSI-RS port (on time-domain), which may be more proper to P-1, P-2 and/or P-3 beam management purpose (particularly, different Tx analogue beams are applied for each sub time unit). In addition, in the case that it is configured to measure CSI-RS and report a desired sub time unit index, and the like for each sub time unit for the beam management purpose, a UE is able to perform a configured operation even by a measurement of a single CSI-RS for each sub time unit. Accordingly, since it is sufficient to attain the purpose intended by a base station even in the case of being limited to "No CDM (on time-domain)", through such a limitation, a UE implementation complexity may be maintained within a proper level efficiently.

And/or, in the case that RS setting #1 is at least used/applied to P-3 beam management purpose (e.g., purpose of reception beam determination of a UE), it may be limited that RS setting #2 is not connected to (specific or all) IM setting in a measurement setting and/or (specific or all) reporting setting, and a UE may not expect other configuration. That is, this is defined/configured with "RS setting only" mode form and the corresponding mode is triggered, or a configuration in the form of "measurement setting with no reporting and/or IM settings" may be separately provided.

That is, a UE to which CSI-RS measurement is configured/indicated for at least P-3 beam management purpose may measure CSI-RS resources transmitted via the same Tx beam, but may not report any CSI (e.g., CRI, RI, PMI and/or CQI) therefor to a base station. On the contrary, a UE to which CSI-RS measurement is configured/indicated for P-1 or P-2 beam management purpose may measure CSI-RS resources transmitted via different Tx beams, and report the CSI (particularly, CRI) according to the measurement result to a base station. This may be represented that a UE that is configured with/receives ResourceRep (or CSI-RS-ResourceRep) RRC parameter' configured with 'on' may not report any CSI to a base station, and a UE that is configured with/receives ResourceRep (or CSI-RS-ResourceRep) RRC parameter' configured with 'off' may report the CSI (particularly, CRI) according to the measurement result of RS (e.g., CSI-RS) to a base station. The reason is, as described above, that P-1 and P-2 procedures are on the purpose of selecting a best Tx beam by a base station (i.e., selection subject is the base station), and it required CSI feedback of a UE. However, since P-3 procedure is on the purpose of selecting a best Rx beam by a UE (i.e., selection subject is the UE), CSI feedback is not necessarily required. However, this is not limited thereto, even in the case of being configured/indicated for the purpose of P-3 beam management, the UE may report CSI to the base station according to an embodiment, as described above.

Accordingly, ReportQuantity' RRC parameter indicating 'No report' may be configured/indicated to the UE to which CSI-RS measurement is configured/indicated for P-3 beam management purpose. Here, the ReportQuantity' RRC parameter may correspond to an RRC parameter indicating CSI related information that the UE needs to report.

Alternatively, when the corresponding RS setting #1 is associated/linked with MIMO CSI feedback purpose in a measurement setting, as exemplified in FIG. 14, by applying "CDM length-x (including time-domain)" is applied to each configured CSI-RS port, it may be prevented an occurrence of measurement time mismatch according to being TDMed between ports. That is, each CSI-RS port may be transmitted by being spread through CDM (of time-domain) via multiple sub time units.

FIG. 14 illustrates this, and all of the small rectangles having the same pattern in FIG. 18 mean a resource unit (or resource position) in which the same CSI-RS port is transmitted. Referring to FIG. 13, the resources of the same pattern may be spread in each time unit period (i.e., spread throughout multiple sub time units). In addition, referring to FIG. 14, the different CSI-RS ports denoted by different patterns may be transmitted in the same resource position with being overlapped. This means that transmission/reception divided for each CSI-RS port is available although the positions of transport resources are overlapped between signals transmitted from each CSI-RS port by sequence/code-domain separation through applying the CDM scheme.

And/or, in the measurement setting associated/related with the corresponding RS setting #1, it may be limited that at least one specific IM setting and/or an assumption including Tx scheme for deriving CQI need to be necessarily indicated (since it is for the purpose of deriving MIMO CSI). Accordingly, a configuration that does not violate it in a measurement setting is available for a base station, and also, a UE does not expect a configuration that violates it.

The contents described so far is just an embodiment, and an application/modification embodiment is also included in the concept of the present invention, which provides a unified CSI-RS configuration and configures/applies in various uses in measurement/reporting setting, and the like with respect to/related it by other different uses/purposes.

As another example, according to RS setting method #2, when configuring CSI-RS, an RS setting may be defined to include time/sub-time unit related parameter always (e.g., parameter related to number of sub time unit existed in a time unit such as interval/starting point/end point of a time unit based on CSI-RS time according to every CSI-RS period, and/or length/position of each sub time unit, and the like (e.g., whether it is consecutive in a time unit or periodic or located irregularly indicated by bitmap form)). In this case, when a base station is to configure the multi-port CSI-RS resource for the existing MIMO CSI feedback, the base station may configure the existing/legacy CSI-RS configuration without any change/similarly by defining/configuring every CSI-RS transmission time indicated by a period/offset on the corresponding CSI-RS configuration as a starting point of the time/sub-time unit, such as defining/configuring the interval of a time unit as 1 subframe and the number of sub-time units existed in a single time unit as 1.

Accordingly, by designing with super-set form such that RS setting method #2 is limited to follow Type 2 CSI-RS configuration only, but also available to include Type 1 CSI-RS configuration, the legacy CSI-RS configuration as described above may be provided.

2. IM Setting

In the case that a UE is configured with IM setting, the UE may receive at least one IM setting via/using an Identifier/ID (e.g., IM setting #1, #2, etc.) for identifying a specific IM setting.

As a parameter configurable in the IM setting, as an embodiment, there is at least one of a specific CSI-IM resource RE position/pattern (e.g., N sets of REs on a specific time/frequency-domain, N may be fixed in advance or configured by a base station, e.g., N=4) and period/offset related parameter (period and/or offset parameter may be omitted when aperiodic CSI-IM is supported/applied, and the operation may be defined/configured to follow a time which is triggered by a base station). And/or, in addition to CSI-IM resource based IM setting, a configuration method may be limited such that the IM setting is applied in the form of referring/indicating a specific RS basis (e.g., configured RS setting ID # k).

The case that a measurement setting is configured in a form of referring to a specific IM setting may be divided into i) the case of configuring IM setting for the purpose of MIMO CSI feedback and ii) the case of configuring IM setting for the purpose of P-1, P-2 and/or P-3 beam management, largely.

i) In the case that a specific IM setting is associated/linked with MIMO CSI feedback purpose in a measurement setting, it may be limited to be necessarily indicated together with an assumption including at least one specific IM setting and/or assumption including Tx scheme for deriving CQI (since it is for the purpose of deriving MIMO CSI) in a measurement setting. Accordingly, a configuration that does not violate it in a measurement setting is available for a base station, and also, a UE does not expect a configuration that violates it.

Ii) In the measurement setting, in the case that a specific RS setting is linked/associated with P-1, P-2 and/or P-3 beam management purpose (particularly, in the case of at least P-3 beam management purpose), it may be limited that the corresponding specific IM setting is not connected to (specific or all) RS setting in a measurement setting and/or (specific or all) reporting setting, and a UE does not expect other configuration that violates it. This may be defined/configured with "RS setting only" mode form and the corresponding mode is triggered, or a configuration in the form of "measurement setting with no reporting and/or IM settings" may be separately provided.

In addition, in P-1 and/or P-2 beam management purpose, it may be that a specific IM setting is referred/configured by a specific measurement setting. In this case, when a UE performs a beam management related report, it may be defined/configured such that the UE derives channel quality related metric like CQI by performing interference measurement by a referred/configured IM setting, and reports the beam ID/index and/or sub time unit index, and the like of which the derived metric is great (i.e., preferred). At this time, the UE may be defined/configured so as to report the channel quality related metric value like CQI (or a specific quantized metric value) together to the base station.

3. Measurement Setting

In the case that a UE is configured with a measurement setting, the UE may receive at least one measurement setting via/using an Identifier/ID (e.g., measurement setting #1, #2, etc.) for identifying a specific measurement setting.

As a parameter configurable in the measurement setting, as an embodiment, there is at least one of RS setting # ID(s), IM setting # ID(s), reporting setting # ID(s), and/or parameter/information such as an assumption that Tx scheme is included for deriving CQI.

In the case that the measurement setting is on purpose of (MIMO) CSI reporting, according to "RS setting method #1" described above, it may be limited that only Type 1 CSI-RS form is configured in the measurement setting. In addition, in the case that the measurement setting is on purpose of (MIMO) CSI reporting, according to "RS setting method #2" described above, the measurement setting may include at least one RS setting, and as exemplified in FIG. 14, by applying "CDM length-x (including time-domain)" to a CSI-RS port configured via each RS setting, it may be prevented an occurrence of measurement time mismatch according to being TDMed between ports (i.e., each CSI-RS port is transmitted by being spread through CDM (of time-domain) throughout multiple sub time units). And/or, (in this case) in a measurement setting, it may be limited to be necessarily indicated together with an assumption including at least one IM setting and/or assumption including Tx scheme for deriving CQI (since it is for the purpose of deriving MIMO CSI) in a measurement setting. Accordingly, a configuration that does not violate it in a measurement setting is available for a base station, and also, a UE does not expect a configuration that violates it.

Alternatively, in the case that a measurement setting is for the purpose of P-1, P-2 and/or P-3 beam management related reporting, according to "RS setting method #1" described above, it may be limited that only Type 2 CSI-RS setting is configured in the measurement setting. In addition, in the case that a measurement setting is for the purpose of P-1, P-2 and/or P-3 beam management related reporting, according to "RS setting method #2" described above, the measurement setting includes at least one RS setting, and as exemplified in FIG. 13, it may be limited that "No (time-domain) CDM" is applied to the CSI-RS port configured via each RS setting. And/or, in the case that the measurement setting is at least used/applied to P-3 beam management purpose (e.g., purpose of reception beam determination of a UE), it may be limited that RS setting #2 is not connected to (specific or all) IM setting and/or (specific or all) reporting setting, and a UE may not expect other configuration.

That is, this is defined/configured with "RS setting only" mode form and the corresponding mode is triggered, or a configuration in the form of "measurement setting with no reporting and/or IM settings" may be separately provided.

In addition, it is apparent that all of the proposed operations in relation to the measurement setting mentioned in other ports of the present disclosure may be included/configured/applied as this measurement setting related operations.

4. Reporting Setting

In the case that a UE is configured with a reporting setting, the UE may receive a configuration of at least one reporting setting via/using identifier/ID (e.g., reporting setting #1, #2, etc.) for identifying a specific reporting setting.

As an embodiment, a parameter configurable in the reporting setting may include at least one of information/parameters such as a periodic or aperiodic reporting mode indicator and/or the associated reporting parameter (e.g., period/offset/resource position/transmission format related parameter for periodic reporting and resource position/transmission format related parameter for aperiodic reporting).

In addition, it is apparent that all of the proposed operations in relation to the reporting setting mentioned in other ports of the present disclosure may be included/configured/applied as this reporting setting related operations.

FIG. 15 is a flowchart illustrating a CSI-RS resource reception method by performed a UE according to an embodiment of the present invention. In relation to this flowchart, all of the description/embodiments described above may be identically/similarly applied, and the overlapped description is omitted.

First, a UE may receive a configuration for a CSI-RS resource set including a plurality of CSI-RS resources (step, S1510). Such a CSI-RS resource set may be configured to the UE by a resource (RS) setting for a CSI report, and the RS setting may be received in the UE via higher layer signaling.

Next, the UE may receive the plurality of CSI-RS resources (step, S1520).

Next, the UE may report the CSI obtained as a measurement result of the plurality of CSI-RS resources based on a configuration on whether the plurality of CSI-RS resources is transmitted via the same or different beams (step, S1530).

More particularly, when a transmission via different transmission beams of the plurality of CSI-RS resources is configured (i.e., in the case of the CSI acquisition procedure of P-1 or P-2 purpose), the UE may report a CRI for the plurality of CSI-RS resources to the base station. That is, the UE may measure/estimate CSI-RS resources for transmitted via different transmission beams, and select the CSI-RS resource of the best performance/optimized, and accordingly, report the CRI corresponding to it to the base station as the CSI. In this case, the base station may select at least one transmission beam among the different transmission beams as a transmission beam to be used for data/signal transmission for the UE based on the CRI transmitted from the UE. Particularly, the base station may select the transmission beam be used for CSI-RS resource transmission corresponding to the CRI transmitted from the UE as a beam to be used for a transmission for the UE. At this time, the reporting method of CSI may be configured to the UE by the CSI reporting setting related to the CSI-RS resource setting, and the CSI reporting setting may be received in the UE by higher layer signaling. A linkage (or connection) relation between the CSI reporting setting and the RS setting may be indicated by a measurement setting configured to the UE (by higher layer signaling).

Alternatively, on the contrary, when a transmission via the same transmission beam of the plurality of CSI-RS resources is configured, the UE may not report the CRI for the plurality of CSI-RS resources to the base station. This is because the CSI acquisition procedure for P-3 purpose is designed to select/determine/change an Rx beam of the UE. At this time, when 'No report' is configured to the UE in relation to the CSI-RS resource (e.g., ReportQuantity RRC parameter configured with 'No report' is configured to/received in the UE), the UE may not report any of the CSI including the CRI to the base station (i.e., reporting no CRI).

In the case that a plurality of CSI-RS resources is transmitted via the same transmission beam, the UE may determine/select a reception beam of the UE based on a measurement result for the plurality of CSI-RS resources. More particularly, the UE may receive/measure a plurality of CSI-RS resources using different reception beams, and determine/select at least one reception beam having an optimal performance among the different reception beams.

The reception beam of the UE and the transmission beam of the base station may be selected jointly/simultaneously (e.g., via a single CSI acquisition procedure), or sequentially selected according to a preconfigured order (e.g., via different CSI acquisition procedure). At this time, the preconfigured order may be determined as an order from the transmission beam to the reception beam (e.g., a transmission beam of the base station is determined by performing P-2 procedure, and a reception beam of the UE is determined by performing P-3 procedure using the determined/selected transmission beam of the base station (as the same transmission beam).

General Apparatus to which the Present Invention May be Applied

FIG. 16 illustrates a block diagram of a wireless communication apparatus according to an embodiment of the present invention.

Referring to FIG. 16, a wireless communication system includes a base station (eNB) 1610 and multiple UEs 1620 located in an area of the base station 1610.

The base station 1610 includes a processor 1611, a memory 1612 and a radio frequency (RF) unit 1613. The processor 1611 implements the functions, processes and/or methods proposed above. The layers of a wired/wireless interface protocol may be implemented by the processor 1611. The memory 1612 is connected to the processor 1611 and stores various pieces of information for driving the processor 1611. The RF unit 1613 is connected to the processor 1611 and transmits and/or receives radio signals.

The UE 1620 includes a processor 1621, a memory 1622 and an RF unit 1623. The processor 1621 implements the functions, processes and/or methods proposed in the embodiment described above. The layers of a radio interface protocol may be implemented by the processor 1621. The memory 1622 is connected to the processor 1621 and stores various pieces of information for driving the processor 1621. The RF unit 1623 is connected to the processor 1621 and transmits and/or receives radio signals.

The memory 1612, 1622 may be located inside or outside the processor 1611, 1621 and may be connected to the processor 1611, 1621 by various well-known means. Furthermore, the base station 1610 and/or the UE 1620 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

Meanwhile, the expression 'A and/or B' may be interpreted to mean at least one of A and/or B.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of implementations by firmware or software, an embodiment of the present invention may be implemented in the form of a module, procedure, or function for performing the aforementioned functions or operations. Software code may be stored in the memory and driven by the processor. The memory may be placed inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The present invention applied to a 3GPP LTE/LTE-A/NR system is primarily described as an example, but may be applied to various wireless communication systems in addition to the 3GPP LTE/LTE-A/NR system.

The invention claimed is:

1. A method for performing a Channel State Information-Reference Signal (CSI-RS) based reporting in a wireless communication system, the method performed by a User Equipment (UE) and comprising:
    receiving, from a base station, a configuration for a (i) first CSI-RS resource set that is based on a time unit and (ii) a second CSI-RS resource set that is based on a sub-time unit, wherein the time unit includes a plurality of sub-time units;
    receiving a plurality of CSI-RS resources included in the second CSI-RS resource set; and
    based on the plurality of CSI-RS resources being configured to be transmitted via different transmission beams, reporting a CSI-RS Resource Indicator (CRI) for the plurality of CSI-RS resources to the base station,
    wherein, based on the plurality of CSI-RS resources being configured to be transmitted via the same transmission beam, the UE does not report any information including the CRI to the base station.

2. The method of claim 1, wherein the first CSI-RS resource set is configured for reporting information related with a channel state, and
    wherein the second CSI-RS resource set is configured for reporting information related with a beam management.

3. The method of claim 1, further comprising:
    based on the plurality of CSI-RS resources being configured to be transmitted via the same transmission beam: selecting a reception beam of the UE based on a measurement result for the plurality of CSI-RS resources.

4. The method of claim 3, wherein selecting the reception beam of the UE comprises:
    measuring the plurality of CSI-RS resources using different reception beams; and
    selecting at least one reception beam among the different reception beams based on the measurement result.

5. The method of claim 3, wherein the base station is a network node selecting at least one transmission beam among different transmission beams based on the CRI transmitted from the UE.

6. The method of claim 5, wherein the reception beam and the transmission beam are jointly selected or sequentially selected according to a preconfigured order.

7. The method of claim 6, wherein the preconfigured order is determined as an order from the transmission beam to the reception beam.

8. The method of claim 1, wherein the configuration includes bitmap information for representing a location of the sub-time unit in the time unit.

9. A User Equipment (UE) configured to perform a Channel State Information-Reference Signal (CSI-RS) based reporting in a wireless communication system, the UE comprising:
    a transceiver;
    at least one processor; and
    at least one computer memory operably connectable to the at least one processor and storing instructions that, when executed by the at least one processor, perform operations comprising:
        receiving, from a base station through the transceiver, a configuration for (i) a first CSI-RS resource set that is based on a time unit and (ii) a second CSI-RS resource set that is based on a sub-time unit, wherein the time unit includes a plurality of sub-time units;

receiving a plurality of CSI-RS resources included in the second CSI-RS resource set; and based on the plurality of CSI-RS resources being configured to be transmitted via different transmission beams, reporting a CSI-RS Resource Indicator (CRI) for the plurality of CSI-RS resources to the base station, wherein, based on the plurality of CSI-RS resources being configured to be transmitted via the same transmission beam, the UE does not report any information including the CRI to the base station.

10. The UE of claim 9, wherein the first CSI-RS resource set is configured for reporting information with a channel state, and wherein the second CSI-RS resource set is configured for reporting information related with a beam management.

11. The UE of claim 9, wherein the operations further comprise:

based on the plurality of CSI-RS resources being configured to be transmitted via the same transmission beam, selecting a reception beam of the UE based on a measurement result for the plurality of CSI-RS resources.

12. The UE of claim 11, wherein the operations further comprise:

measuring the plurality of CSI-RS resources using different reception beams; and selecting at least one reception beam among the different reception beams based on the measurement result.

13. The UE of claim 11, wherein the base station is a network node selecting at least one transmission beam among different transmission beams based on the CRI transmitted from the UE.

14. The UE of claim 13, wherein the reception beam and the transmission beam are jointly selected or sequentially selected according to a preconfigured order.

15. The UE of claim 14, wherein the preconfigured order is determined as an order from the transmission beam to the reception beam.

16. The UE of claim 9, wherein the configuration includes bitmap information for representing a location of the sub-time unit in the time unit.

* * * * *